United States Patent
Cullen et al.

(10) Patent No.: US 10,635,999 B2
(45) Date of Patent: Apr. 28, 2020

(54) METHODS AND SYSTEMS FOR CONTROLLING A DISPLAY SCREEN WITH GRAPHICAL OBJECTS FOR SCHEDULING

(71) Applicant: ACCURATE GROUP HOLDINGS, LLC, Independence, OH (US)

(72) Inventors: Michael S. Cullen, Bay Village, OH (US); Matthew R. Wasylyk, Chardon, OH (US); Dwayne William Waite, Sr., Charlotte, NC (US); Frank John Guarnera, Jr., Strongsville, OH (US); Rami Issa Zaboura, Middleburg Heights, OH (US); Kenneth Charles Gilbert, Aspinwall, PA (US)

(73) Assignee: ACCURATE GROUP HOLDINGS, LLC, Independence, OH (US)

( * ) Notice: Subject to any disclaimer, the term of this patent is extended or adjusted under 35 U.S.C. 154(b) by 218 days.

(21) Appl. No.: 15/648,394

(22) Filed: Jul. 12, 2017

(65) Prior Publication Data
US 2019/0019132 A1    Jan. 17, 2019

(51) Int. Cl.
*G06Q 10/00* (2012.01)
*G06Q 10/06* (2012.01)
(Continued)

(52) U.S. Cl.
CPC ....... *G06Q 10/063112* (2013.01); *G06F 7/02* (2013.01); *G06Q 10/06316* (2013.01);
(Continued)

(58) Field of Classification Search
None
See application file for complete search history.

(56) References Cited

U.S. PATENT DOCUMENTS 8,046,298 B1 * 10/2011 Voth ............... G06Q 40/00
705/35
8,370,267 B2 * 2/2013 Carey ............ G06Q 30/0278
705/306
(Continued)

OTHER PUBLICATIONS

What to Expect From a Home Appraisal, Jan. 6, 2016, American Finance, Mortgage Basic, https://www.americanfinancing.net/mortgage-basics/home-appraisal-checklist, p. 1-6.*

*Primary Examiner* — Joseph M Waesco
(74) *Attorney, Agent, or Firm* — Cooper Legal Group, LLC

(57) ABSTRACT

Methods and systems of assigning an appraiser to perform a task are provided. A request may be evaluated to identify elements corresponding to the request. The elements may be evaluated to determine the task having a task a task parameter, such as conducting an appraisal. The task may comprise accepting an appraisal order, contacting a property owner, setting up a meeting, identifying comparable properties, confirming an appraisal time, submitting the appraisal report, or submitting a satisfaction survey. An appraiser database may be assessed to identify a group of appraisers having appraiser characteristics corresponding to the task parameter. Appraisal scores may be determined for the appraisers within the group of appraisers. The task may be assigned to an appraiser within the group of appraisers based upon the appraisal scores. Responsive to the task being assigned to the appraiser, an assignment notification may be provided to the appraiser.

20 Claims, 16 Drawing Sheets

(51) Int. Cl.
*G06F 7/02* (2006.01)
*G06Q 40/02* (2012.01)
*G06Q 30/02* (2012.01)

(52) U.S. Cl.
CPC . *G06Q 10/063114* (2013.01); *G06Q 30/0278* (2013.01); *G06Q 40/025* (2013.01)

(56) References Cited

U.S. PATENT DOCUMENTS

| | | | | |
|---|---|---|---|---|
| 10,198,735 | B1* | 2/2019 | Humphries | G06Q 30/02 |
| 10,380,653 | B1* | 8/2019 | Flint | G06Q 30/0278 |
| 2002/0035520 | A1* | 3/2002 | Weiss | G06Q 30/0625 |
| | | | | 705/26.62 |
| 2003/0033241 | A1* | 2/2003 | Harari | G06Q 40/025 |
| | | | | 705/38 |
| 2006/0085207 | A1* | 4/2006 | Carey | G06Q 10/00 |
| | | | | 705/306 |
| 2007/0106523 | A1* | 5/2007 | Eaton | G06Q 50/167 |
| | | | | 705/7.38 |
| 2007/0260620 | A1* | 11/2007 | Smolen | G06F 16/2308 |
| 2008/0091476 | A1* | 4/2008 | Graff | G06Q 40/00 |
| | | | | 705/4 |
| 2008/0097898 | A1* | 4/2008 | Hibbert | G06Q 40/00 |
| | | | | 705/38 |
| 2008/0201247 | A1* | 8/2008 | Bradford | G06Q 30/00 |
| | | | | 705/35 |
| 2009/0018952 | A1* | 1/2009 | Beltran | G06Q 30/02 |
| | | | | 705/38 |
| 2009/0119200 | A1* | 5/2009 | Riviere | G06Q 40/04 |
| | | | | 705/37 |
| 2009/0265332 | A1* | 10/2009 | Mushtaq | G06Q 30/0245 |
| 2013/0304629 | A1* | 11/2013 | Attaway | G06Q 40/025 |
| | | | | 705/38 |
| 2014/0222637 | A1* | 8/2014 | Giles | G06Q 40/02 |
| | | | | 705/35 |
| 2015/0127399 | A1* | 5/2015 | Dattaray | G06Q 10/063112 |
| | | | | 705/7.14 |
| 2015/0170078 | A1* | 6/2015 | Dattaray | G06Q 10/06311 |
| | | | | 705/7.13 |
| 2015/0170300 | A1* | 6/2015 | Wilson | G06Q 50/16 |
| | | | | 705/313 |
| 2015/0193874 | A1* | 7/2015 | Niccolini | G06Q 30/0278 |
| | | | | 705/38 |
| 2015/0317728 | A1* | 11/2015 | Nguyen | G06Q 40/02 |
| | | | | 705/38 |
| 2016/0125481 | A1* | 5/2016 | Sicklick | G06Q 30/0278 |
| | | | | 705/306 |

* cited by examiner

METHODS AND SYSTEMS FOR CONTROLLING A DISPLAY SCREEN WITH GRAPHICAL OBJECTS FOR SCHEDULING

BACKGROUND

Computing devices are used to implement various graphical services and products, such as preparing a loan. A computing device may provide a graphical user interface (GUI) with which a user may interact. The GUI may display various graphical objects. Such graphical objects may provide information about a service, such as scheduling of tasks, being performed by the computing device. Scheduled tasks may be stored within databases or other storage structures of a distributed network environment (e.g., a cloud service), or within databases or other storage structures of a local computer. A user may interact with the graphical objects to perform operations upon the scheduled tasks. For example, the graphical objects may be used to add new tasks, to remove existing tasks, or to modify existing tasks, and new graphical objects may be created and displayed to represent the changes.

Lenders often secure loans by utilizing the equity in real estate as collateral for loans. As part of the process of underwriting a loan to be secured by real estate the value of the real estate being utilized as collateral needs to be determined. In determining this value, a real estate appraisal[1] is often ordered by the lender. The appraisal is performed by an appraiser trained to assess relevant information about the real estate in order to determine an estimation of the real estate's value. However, many aspects involved in the generation of an appraisal are highly subjective and/or objective in nature. Thus, identifying an appraiser with the proper experience/training can be an important task but is not always easy to achieve based upon a shortage/backlog of appraisers available to perform appraisals in a timely manner as well as the specific skills, competencies, experience and qualifications of the appraisers.

Still further, the loan process involves a great number of project team members performing a plurality of tasks in order to approve a loan for a real estate transaction. In an attempt to keep everyone up-to-date and organized through this process, a great deal of information is exchanged on a regular basis.

In order to improve use of the GUI, reduce network bandwidth, processing and storage sources, and/or overall system load, it is desirable to efficiently identify and display acceptable time slots for new tasks via graphical objects.

Unfortunately, project team members may fail to be aware of potentially relevant updates and/or delays as a result of insufficient communication; and/or updating mechanisms (e.g., responsive to an appraiser sending an appraisal report to a first project team member not a second project team member, the second project team member may not be made aware that the appraisal was performed in an efficient manner, if at all). Responsive to a lack of communication, project team members may not realize that a task has been completed and/or is not ready to be completed. This can result in unnecessary delays and/or duplicative work being performed.

SUMMARY

In accordance with the present disclosure, one or more systems and/or methods for assigning a valuation task (e.g., accept an appraisal order, contact a property owner to schedule an appraisal and/or an inspection, conduct the inspection or appraisal, collect additional information necessary to preparation of the appraisal report, prepare the appraisal report, submit an appraisal report, etc.) are provided. In an example, a request may be evaluated to identify appraisal elements corresponding to the request. In an example, the request may comprise a project team member submitting a loan document (e.g., an appraisal order/assignment, etc.) to an automation component and/or the project team member may provide the request by entering project information into a user interface associated with the automation component. The appraisal elements may be evaluated to determine a valuation task (e.g., an appraisal, evaluation, valuation, automated valuation (AVM), broker price opinion (BPO), inspection and any sub-tasks of the foregoing or cascades of any as may be appropriate, or the like). having a task parameter. In another example, at least one of a business rule, a product, or the appraisal element may be evaluated to determine the valuation task. The valuation task may comprise accepting an appraisal order or assignment, contacting a property owner, setting up a meeting, identifying comparable properties, confirming an appraisal time, conducting a property inspection, preparing an appraisal report, submitting the appraisal report, responding to question from a project team member, submitting a revised report, or submitting a satisfaction survey. An appraiser database may then be assessed to identify a group of appraisers having appraiser characteristics corresponding to the task parameter. Appraisal scores may be determined for the appraisers within the group of appraisers. In an example, the appraiser scores may be determined based upon a plurality of sub-scores (e.g., a quality sub-score, a compliance sub-score, a distance sub-score, an experience sub-score, an availability sub-score, etc.). The valuation task may be assigned to an appraiser within the group of appraisers based upon the appraisal scores. Responsive to the valuation task being assigned to the appraiser, an assignment notification may be provided to the appraiser.

In an example, a second valuation task may be identified from the request. In another example, a specialty task (e.g., a notarization task, an inspection task, an attorney review task, etc.) may be identified from the request. The valuation task, the second valuation task, and/or the specialty task may be utilized to generate a workflow associated with a real estate transaction. In an example, dynamic vendor due dates for the appraiser may be determined based upon historical information. A date of anticipated completion for tasks within the workflow may be updated based upon the dynamic vendor due date.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware, or any combination thereof.

1. Computing Scenario

The following provides a discussion of some types of computing scenarios in which the disclosed subject matter may be utilized and/or implemented.

1.1. Networking

Figure 1:
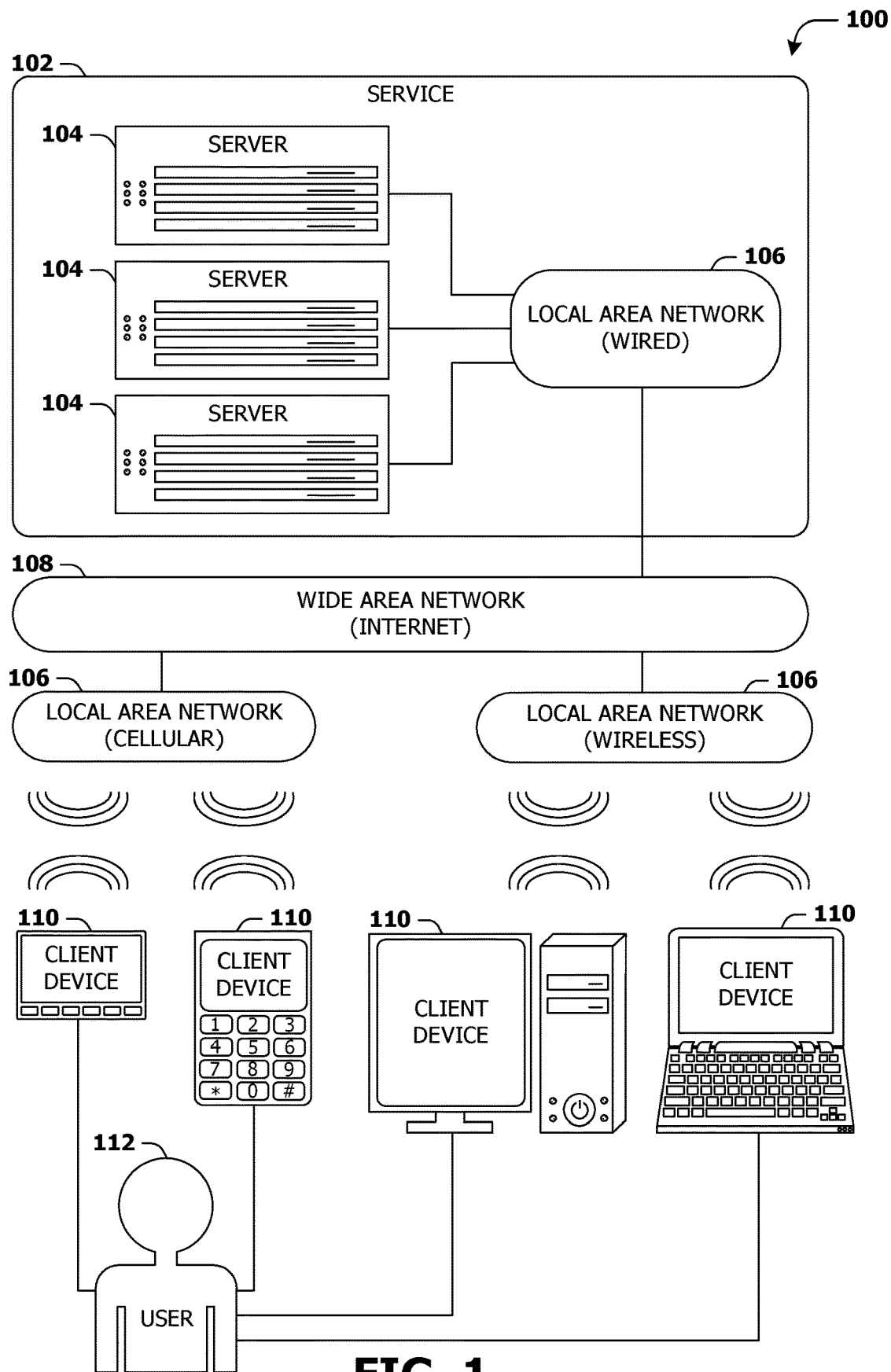
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fibre Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols, and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi network or a Bluetooth personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
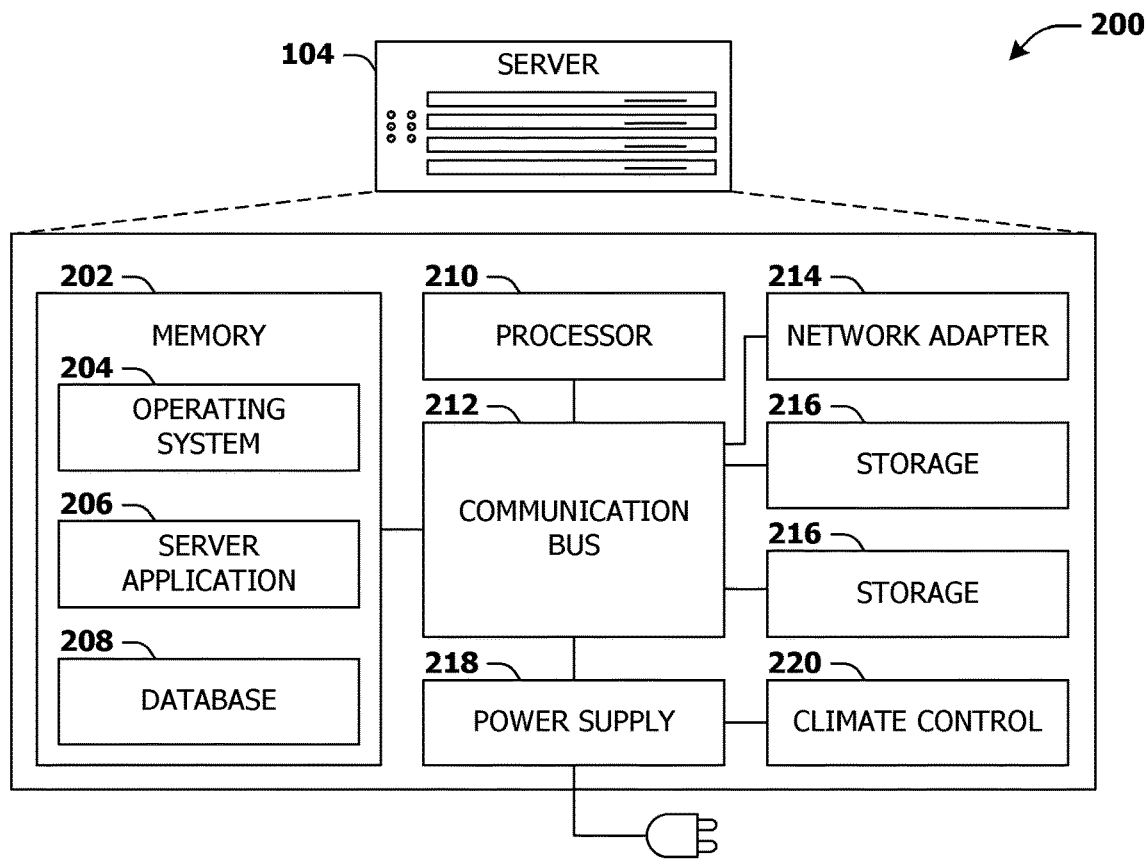
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
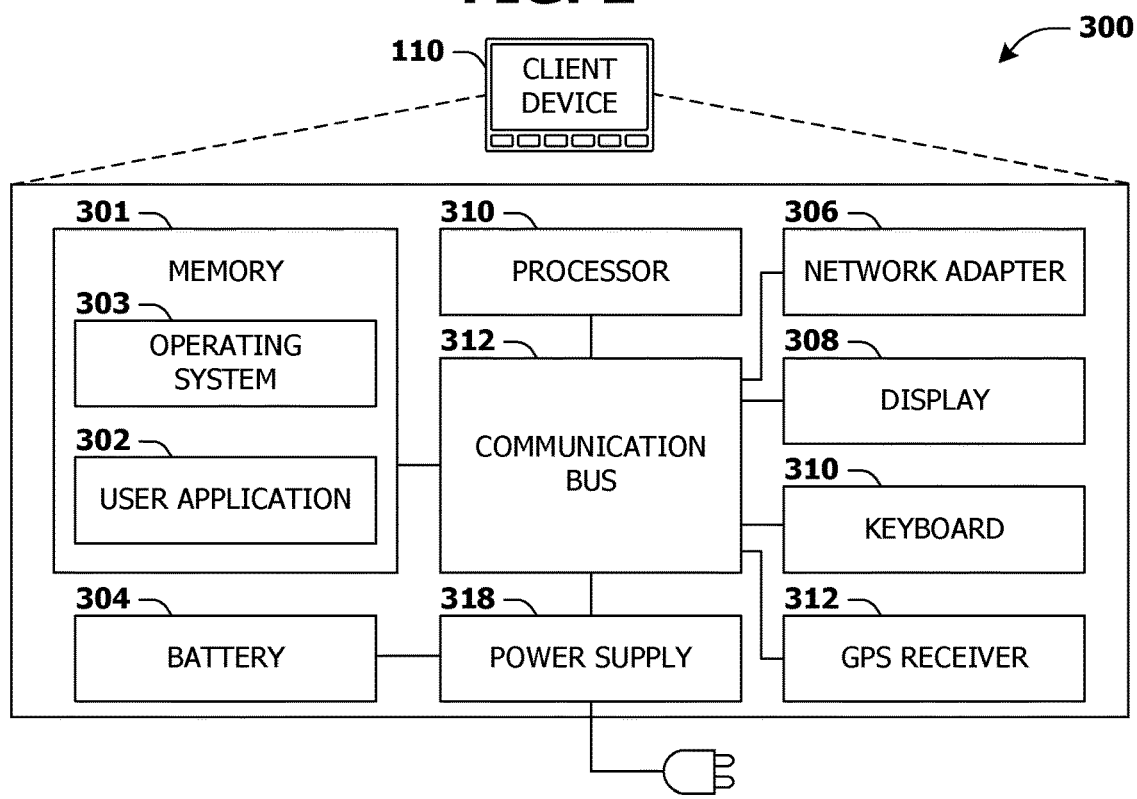
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more systems and/or techniques for assigning a task is provided. Many workflow assignment techniques may lack a capability to identify a proper set of tasks to accomplish a project goal and/or lack an efficient means of selecting appropriate individual (e.g., project team members) for performing project tasks (e.g., scheduling an appraisal, conducting an appraisal, submitting an appraisal report, setting up a meeting to sign closing documents, setting up an inspection, arranging for a notary to be a signing event, etc.). For example, many assignment techniques/processes may assign tasks, such as valuation task to project team members, such as appraisers that are not as qualified as other appraisers to perform said tasks. As provided herein, a request may be evaluated to identify request elements (e.g., notary elements, appraisal elements, surveyor elements, etc.) corresponding to the request. In an example, the request may comprise a project team member (e.g., a lender, a borrower, an appraiser, an inspector, a seller, a notary, an attorney, a mortgage broker, etc.) submitting a loan application to an automation component. The request elements may be evaluated to determine a task (e.g., provider task, such as an appraisal task) having one or more task parameters. A service provider database (e.g., an appraiser database, an inspector database, an automated valuation provider database, a notary database, an attorney database, etc.) may be assessed to identify a group of providers (e.g., an appraiser, a notary, an attorney, a surveyor, and/or other specialists, etc.) having provider characteristics corresponding to the task parameter. Provider scores (e.g., appraisal scores, inspector scores, vendor scores, notary scores, etc.) may be determined for the providers within the group of providers. In an example, the provider score may be determined based upon a plurality of sub-scores. The task may be assigned to a provider within the group of providers based upon the provider scores. In an example, a plurality of tasks may be organized into a workflow based upon at least one of a business rule, a product requirement, and/or provider elements. In an example, tasks (e.g., valuation tasks) may be assigned to a host of providers, such as real estate agents (e.g., for broker price opinions), lay practitioners (e.g., for evaluations), software engineers (e.g., for automated valuations), inspectors (e.g., for property condition inspections, bifurcated inspections, such as where the appraiser performs a desktop appraisal and relies on a third party to perform the required inspection, etc.).

By assigning tasks to providers, such as appraisers, vendors, employees, or the like, based upon provider scores, project team member's experiences may be improved as a result of the most qualified providers, which may otherwise not have been assigned the task, being assigned the task. Moreover, project team members may prioritize various considerations, such as selecting the most experienced providers for a given task and/or meeting other requirements/objectives set forth by lenders (e.g., appraisers experienced in performing appraisals on waterfront properties may be assigned a waterfront property appraisal task, a lender that prioritizes reducing time to closing may prioritize availability sub-scores over an experience sub-score thereby favoring appraisers having greater availability, etc.). Additionally, by utilizing the workflow, a project team member experience may be improved because irrelevant communications, which the project team members may have otherwise had to view, may not be provide to the project team members (e.g., only notification associated with a particular project team member may be provided to said project team member, project team members may utilize a user interface associated with the workflow to access relevant information regarding task statuses at their convenience). For example, by providing project team members with relevant notification of status updates, project team members are less likely to inefficiently search for communications related to important status updates and/or duplicate requests for updates from other project team members, which may in turn mitigate wasted computing resources and time (e.g., reduced labor time, reduced server/platform time, etc.) otherwise spent attempting to obtain relevant status updates associated with tasks (e.g., reduce search engine and/or email server usage traffic that results from additional searches being performed, reduce time spent responding to duplicative update requests, etc.). Additionally, by automating the assignment process and tracking/update process, project team members may be able to more efficiently respond to challenges (e.g., providers rejecting a task assignment), delays (e.g., weather delays, life event delays, etc.) and/or unexpected project advancements (e.g., appraiser has a cancelation and is able to complete an appraisal 5 days ahead of schedule, etc.) as they occur in real time and/or near real time. Accordingly, computing resources may be reduced, project team member efficiency may be improved, and project team members' satisfaction may be improved.

Figure 4:
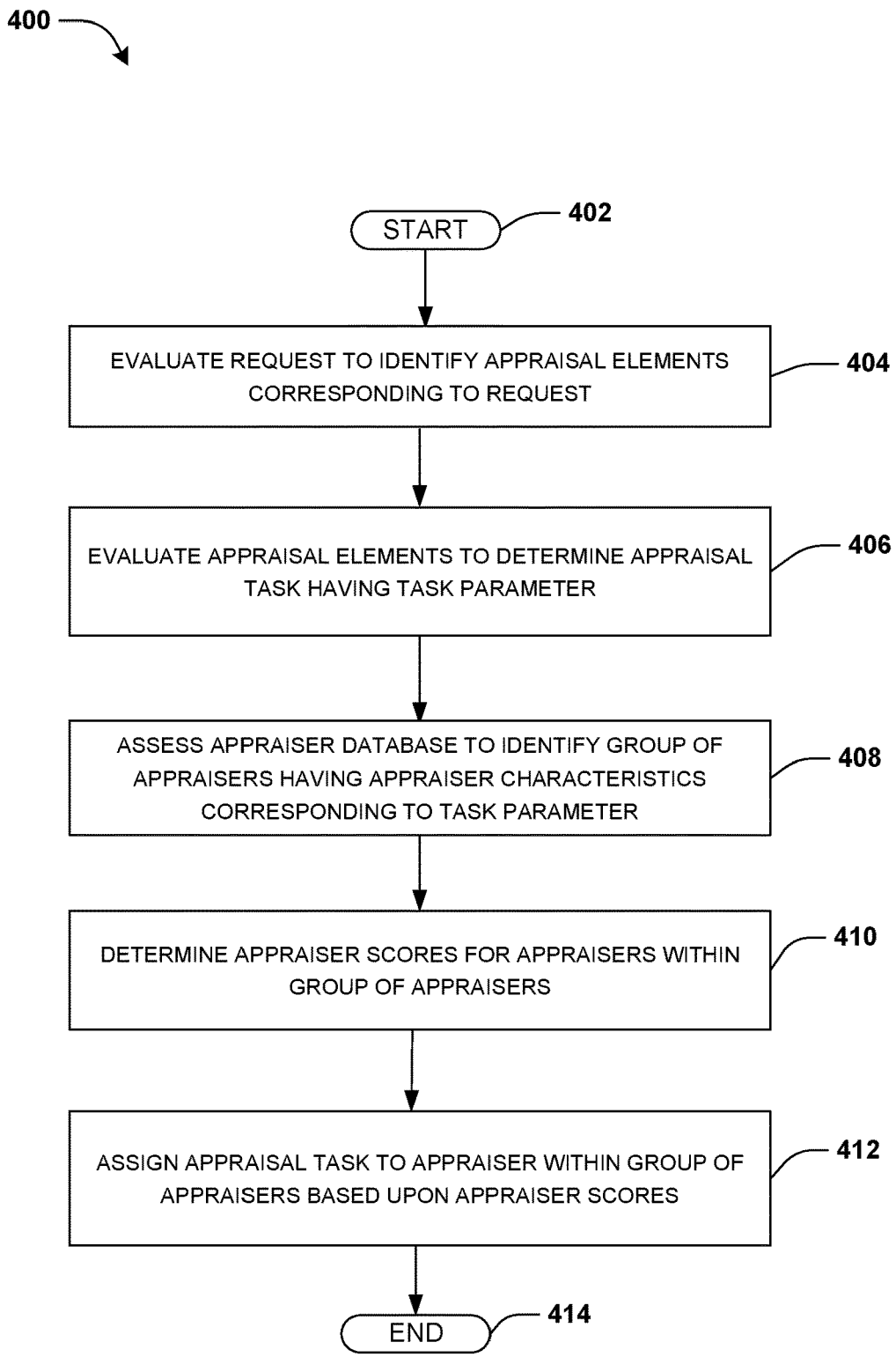
FIG. 4 is a flow chart illustrating an example method for assigning an valuation task.

An embodiment of assigning a valuation task is illustrated by an example method 400 of FIG. 4. At 402, the method 400 starts. At 404, a request is evaluated to identify request elements (e.g., appraisal elements) corresponding to the request. In an example, the request may be provided by a project team member (e.g., a loan officer, a buyer, a seller, a refinancer, a notary, an appraiser, etc.). For example, the project team member may provide the request by entering request information into a user interface associated with an automation component (e.g., the project team member may log into the user interface and provide details associated with an appraisal that needs to be conducted as part of a loan process, such as by providing a property address and/or selecting an appraisal product from drop down menu displayed by the user interface, etc.). In another example, the request may be evaluated in response to a document, such as a loan document (e.g., the request may comprise the loan application or other document being provided) being provided to the automation component (e.g., the loan application may be uploaded by a loan officer, a buyer may fill out the loan application directly within the user interface, etc.). Content identification methods may be employed to evaluate the request (e.g., the loan document) to identify the task elements. The content identification methods may employ image recognition and processing techniques (e.g., the text of a loan document may be evaluated utilizing textual and contextual recognition processes to determine that the property associated with the loan application is a single family home, etc.). In an example, third party databases may be utilized to identify the request elements (e.g., an address from the document may be utilized to query a county auditor database to determine that the property associated with the address is a single family home).

In an example, the request element may comprise location elements, time elements, credit score elements, debt to income ratio elements, property elements, appraisal product elements, complexity score elements, lender requirement elements, fee type elements, loan type elements, dynamic requirement elements, or business rule exception elements. The request elements may correspond to buyer information (e.g., name, address, credit score, etc.), seller information, lender information (e.g., contact information for the lender), property information (e.g., a property address, a property type, a square footage of property, days the property has been on the market, previous sale price, etc.), loan information (e.g., loan amount, interest rate, loan term, closing requirements, etc.), product information (e.g., single family appraisal, distance a comparable property can be from an appraised property, allowable variation in square footage for comparable properties, etc.), or dynamic requirement elements. In an example, dynamic requirement elements may be identified from inputs provided to customizable fields displayed within the user interface. In this way, the project team members can provide custom requirements for carrying out the tasks when submitting the request.

At 406, the request elements may be evaluated to identify a valuation task having one or more task parameters. In an example, machine learning techniques may be employed to evaluate the request elements to determine the valuation tasks. The machine learning techniques may comprise supervised learning, unsupervised learning, reinforcement learning, classification modeling, clustering, structured prediction, or neural network computations. In an example, one or more fields from a loan document may be identified and evaluated to identify inputs provided by project team members. The inputs may be processed utilizing by machine learning techniques to identify the valuation task and the corresponding task parameters. In another example, a product element may be utilized to identify a corresponding valuation task (e.g., a single family appraisal product may have one or more valuation tasks that have been predetermined to be associated therewith)

In an example, the valuation task may comprise an action or actions associated with a valuation, appraisal, lending, and/or project management process. For example, the valuation task may comprise accepting an appraisal, contacting a property owner, setting up a meeting, identifying comparable properties (e.g., properties having similar attributes, such as size, location, age, build quality, etc.), confirming an appraisal time, conducting an appraisal, preparing an appraisal report, submitting the appraisal report, responding to question from a project team member, submitting a revised report, submitting a satisfaction survey, or the like. In an example, the valuation task may be an appraisal task. The appraisal task may be associated with a real estate appraisal, a car appraisal, a boat appraisal, a jewelry appraisal, an antique appraisal, a company appraisal, an estate appraisal, a collectable goods appraisal (e.g., a card collection appraisal, a comic book appraisal, a coin collection appraisal, a gun collection appraisal, a book collection appraisal, a record collection appraisal, etc.), artwork appraisal, or an intellectual property portfolio appraisal. In an example, a real estate appraisal task may comprise performing a commercial property appraisal, a single family home appraisal, a rental property appraisal, a condo appraisal, a land appraisal, or the like.

The task parameters may comprise detail regarding how the appraisal task is to be performed. The task parameters may comprise period of performance parameters (e.g., an appraisal may need to be completed within 15 days of an appraisal being accepted by an appraiser, an appraisal report may need to be submitted within 48 hours of an appraisal being completed, etc.), provider location parameters (e.g., an providers office must with within a 10 miles of a property), comparable property parameters, experience parameters (e.g., property type experience parameters, location experience parameters, etc.), availability parameters, license requirement parameters, payment term parameters (e.g., vendor requested fee, bank standard fee, performance based fee, etc.), performance score parameters, or the like.

In an example, the request element may be utilized to access a business rule database to identify a business rule associated with the valuation task (e.g., one or more rules pre-set by a lender that submitted the request). The business rule may correspond to a product and/or lender. The business rule may comprise a location rule, an experience rule, a workload rule, a service rule, a performance rule, a licensure rule, a loan type rule, a loan amount rule, or the like. Put differently, the business rule may comprise requirements that must be met if for valuation tasks associated with particular request elements (e.g., a location rule may require that an provider's office must be within 13 miles of a property location if the property is in an urban area and/or the provider's office must be within a 30 miles of a property location if the property is in a rural area). In an example, the business rule and/or the request element may be utilized to determine the task parameter for the valuation task.

In an example, responsive to a business rule exception element being identified, a task parameter may be determined based upon the business rule exception element and not the business rule. For example, a first lender may have defined a first business rule corresponding to a 17-day performance period for all appraisals requested (e.g., all appraisals for the first lender must be completed within 17 days of receiving an appraisal request). However, responsive to a business rule exception element corresponding to a 10-day performance period being identified, the business rule exception element, but not the business rule, may be utilized to determine the task parameter for the valuation task (e.g., the business rule exception will supersede the business rule thereby making the period of performance for this particular appraisal 10 days).

In an example, a workflow may be generated based upon the valuation task and/or an appraisal review (e.g., an appraisal review may generate an appraisal risk score that may be utilized to drive/structure the workflow and create operational efficiencies). The workflow may comprise a plurality of valuation tasks (e.g., accept an appraisal assignment, set up a meeting to conduct an appraisal, submit appraisal, etc.). The work flow may be displayed by the user interface. In an example, the workflow may be updated in real time or near real time based upon status updates for the valuation tasks. The workflow may comprise a set of valuation tasks, a set of task statuses associated with the valuation tasks within the set of valuation tasks (e.g., in progress, completed, delayed, in queue, etc.), a date of completion and/or a date of anticipated completion for the valuation tasks. In an example, at least one of a business rule, the request element or the valuation task may be utilized to generate a workflow (e.g., responsive to the first valuation task being identified, a business rule associated with the first valuation task may indicate that a series of other task are to be included in the workflow). In another example, a dynamic vendor due date may be determined for the provider based upon historical information associated with the provider. The date of anticipated completion for tasks within the workflow may be updated based upon the dynamic vendor due date (e.g., if the appraiser historically takes 4 days to submit a report after a multi-family appraisal is completed, the anticipated completion date for a submitting appraisal report task may be updated to 4 days). In an example, the workflow may be generated in real time and/or near real time in response to an order being created (e.g., the workflow may be generated in response to a request being received, such as a loan document being provided or a project team member utilizing a user interface to create an order). The workflow may be created as a custom workflow that is uniquely tailored elements, such as product type, geography, client, and business rules.

At 408, a provider database (e.g., an appraiser database, a notary database, an inspector database, etc.) may be assessed to identify a group of providers (e.g., appraisers, inspectors, notaries, attorneys, auditors, etc.) having provider characteristics (e.g., appraiser characteristics, inspector characteristics, etc.) corresponding to the task parameter. In an example, the provider characteristic may comprise a location characteristic (e.g., location of the appraisers office, location of the appraisers home, etc.), an experience level characteristic (e.g., apprentice with 1 year of experience, licensed appraiser with 2 years of experience, licensed appraiser with 10 years of experience, etc.), an availability characteristic (e.g., appraiser is busy for next 3 days, appraiser is busy for the next 4 weeks, appraiser is retired, etc.), a specialty characteristic, a license characteristic (e.g., is the appraiser license, which state is the appraiser licensed in, is the appraisers license active, etc.), or a travel distance characteristic (e.g., distance the appraiser is willing to travel). In an example, the specialty characteristic may comprise a property type specialty (e.g., an appraiser may have significant experience or training in appraising waterfront properties, ski lodges, farms, 30+ unit commercial properties, commercial land, etc.) or a location specialty (e.g., an appraiser may have significant experience and/or training with properties in a specific zip code, an urban area, rural area, etc.). In an example, each appraiser in a group of appraisers may be assigned a performance score. The appraisers within the group of appraisers may be further grouped into tiers based upon their respective performance scores.

The provider database may comprise a repository for storing and managing information associated with providers, such as provider characteristics. In an example, the provider database may comprise at least one of a relational database, an object oriented database, a key value database, a distributed provider database (e.g., open source provider database, a bigtable appraiser database, etc.), a directory services provider database, or a virtual machine provider database. The information may be provided to the provider database by the providers. For example, the providers may generate provider profiles containing information associated with the provider. In an example, the information may be obtained from data sources accessible via at least on of an internet (e.g., the World Wide Web), an intranet, or a remote host server. The data sources may comprise webpages, such as a county auditor web page, a local newspaper webpage, a community blog webpage, a federal licensing webpage, a state licensing webpage, a social media webpage, or the like. In an example, the information may comprise provider interests. The provider interests may be identified from a social media page associated with the provider and/or directly by the provider providing said provider interests.

In an example, a query may be created based upon the task parameters for the valuation task. The query may be utilized to identify providers within the provider database having provider characteristics that correspond to the task parameters. The query may comprise a query request having search request parameters (e.g., databases to search, expansion policies, expansion protocols for meta tags, wildcard expressions, relevance scoring parameters, device identification information, search timeframe parameters, etc.). The search request parameters may be utilized to expand the query to generate an expanded query. In an example, the expanded contact query may comprise alternate spellings for information associated with the request elements, alternative licensure accreditations, alternate mapping coordinates (e.g., zip code, g.p.s, longitude/latitude, etc.), or the like.

At 410, provider scores may be determined for providers within the group of providers. In an example, a first provider score may be determined for a first provider within the group of providers and a second provider score may be determined for a second provider within the group of providers. The provider scores may be generated based upon historical information associated with the providers and/or provider characteristics.

The provider score may comprise sub-scores, such as a distance sub-score (e.g., an provider located within 4 miles of a property to be appraised may have a higher distance score than a second provider located within 12 miles from the property to be appraised, etc.), a quality sub-score (e.g., an provider that has had 10 reports sent back in the last year to correct mistakes, such as an incorrect property address may have a higher quality score than the second provider that has had 24 reports sent back in the last year), a service sub-score (e.g., a higher service score may be assigned to the provider in response to the provider: accepting tasks within 24 hours, attempting to schedule an appraisal within 48 hours, or submitting appraisal reports within 48 hours of conducting an appraisal), a performance sub-score, an experience sub-score (e.g., sub-score based upon feedback from previous project team members), a compliance sub-score (e.g., is the provider currently in compliance with all and/or some state and federal regulations), an availability sub-score (e.g., an provider that is available to conduct an appraisal in 4 days may have a higher availability score than a second provider that is available to conduct the appraisal in 14 days), remaining volume sub-score (e.g., score that is indicative of how many other appraisals the provider needs to complete), or the like. The quality score may be indicative of a number of errors identified in previous appraisal, such as was a report sent back to provide missing information (e.g., address, date of appraisal, etc.), was information incorrectly utilized in the report (e.g., wrong address, wrong seller name, etc.), was there a violation of lender business rules, and/or was an explanation provided for non-compliance matters (e.g., did the appraiser explain why no comparable properties were identified within a lender set proximity range, etc.).

In an example, the provider score may comprise an interest sub-score. The interest score may be determined based upon a provider interest for the provider corresponding to a project team member interest (e.g., an appraiser and a property owner that both have an interest in collecting baseball cards may be determined to have a high interest score, etc.). In this way, the project team members may be connected with other project team members having similar interest thereby leading to an improved project team member experience.

In an example, a weighing component may apply a weighing factor to at least one of the sub-scores to generate weighted scores. The weighted scores may be utilized to generate the provider scores for the providers within the group of providers. The weighing factors may be determined based upon weighting parameters learned from training data. In another example, the weighing factor may be applied to the sub-scores by a project team member by utilizing a toggle displayed by the user interface. In yet another example, the weighing factor may be applied to the sub-scores based upon business rules associated with a lender organization. The weighing factor may be indicative of an importance of a particular sub-score (e.g., the more important the sub-score is to a project team member, the greater the weight may be for that sub-score). For example, responsive to a first sub-score having a larger weighing factor than a second sub-score, the first sub-score may have a greater impact on the overall provider score.

At 412, the valuation task may be assigned to a provider within the group of providers based upon the provider scores. In an example, the valuation task may be assigned to the first provider in response to the first provider score being greater than the second provider score. The providers within the group of providers may be ranked based upon the provider scores for the providers within the group of providers. For example, the first provider may be prioritized above the second provider responsive to the provider score of the first provider being indicative of the first provider being better suited to perform the valuation task within the task parameters and/or in accordance with the lender business rules. In this way, project team members may have qualified providers (or other professionals as applied to other tasks) assigned based upon objective metrics and real-time and/or near real-time information from the providers.

In an example, responsive to the valuation task being assigned to the provider, a notification may be provided to the provider. The notification may comprise at least one of a push notification, an email notification, a text notification, a virtual reality notification, or an augmented reality notification. In an example, the automation component being hosted on a first platform may send the notification to a second platform and/or the mobile device of the provider. The notification may be displayed within a user interface associated with the mobile device. In an example, the notification may comprise a summary element (e.g., a summary of the valuation task, a summary of a result of a valuation task being completed, etc.), a messaging element, a related contact notification element, and/or a services element. The summary element may contain text describing the valuation task including a due date, payment terms, or the like. In an example, the summary element may be generated based upon the task parameters. The messaging element may be utilized by a project team member or provider to send a message to another project team member (e.g., the provider may message other project team members to inform them the appraisal was not performed because the property owner or real estate agent was not at the property for the appraisal). In an example, the message may comprise a text message, a voice message, a social media message, an augmented reality message, a virtual reality message, an email message, a message board message, and/or an automation system message. In an example, the user may compose, edit and send the message from the user interface (e.g., the messaged may be composed within the same mobile application associated with the notification). The related contact notification element may be utilized to automatically populate a message to a property owner to schedule a time for the valuation task. In an example, responsive to the user selecting the related contact notification element, a list of other contacts associated with project team members may be displayed within the user interface (e.g., if the valuation task is associated with a particular office within the lender's company, a list of project team members within that particular office may be populated in a messaging element of the notification).

In an example, a contact database may be generated from the request elements. For example, contact information for the project team members may be identified from the request elements task (e.g., the names, addresses, emails, and phone numbers for the buyer, seller, loan officer, spouse of the buyer, etc. may be identified from the loan document and compiled into a contact database associated with the valuation task). The contact information may be correlated and stored in the contact database (e.g., names, addresses, phone numbers, employers and other relevant information for the project team members may be identified from loan documents and categorized, respectively). In an example, the automation component may utilize the request elements (e.g., names of project team members) to access third party information to generate the contact database. For example, local contacts (e.g., contacts added to an electronic address book on the mobile device) and/or unified contacts (e.g., contacts synced from a plurality of sources, such as social media accounts, cloud based address books, email contact lists, client lists, etc.) may be assessed to generate the contact database. In an example, the contact database may comprise contact information for a first project team member identified from a mobile phone address book and contact information for a second project team member identified from the loan document (e.g., a global contact database). The contact database may be utilized by project team members to efficiently and effectively locate contact information for other project team members, such as without the need to search through a plurality of loan documents and/or other communication, to locate contact information needed to complete the valuation tasks. In another example, the automation component may access the contact database to identify contact information of an individual associated with an valuation task and provide the contact information for the individual to the provider in a notification (e.g., responsive to the appraiser accepting an appraisal assignment for a property, an email may be delivered to the appraiser containing the contact information for a seller of the property and/or a spouse of the seller).

In an example, responsive to the provider accepting the valuation task, a calendar of the provider may be assessed to identify a schedule of availability for the provider (e.g., a calendar hosted on a mobile device of the provider may be accessed to determine when the provider is free to conduct the valuation task). The schedule of availability may comprise one or more potential meeting times for performing the valuation task. The one or more potential meeting times may be provided to a property owner as potential meeting times for performing the valuation task. In an example, the provider may preapprove potential meeting times, which may be automatically provided to the property owner in response to the provider accepting the valuation task (e.g., the provider may set up a schedule of availability for performing valuation tasks). In another example, the one or more potential meeting times may be prepopulated into a custom message displayed within the user interface which the provider may edit and/or elect to send to the property owner.

In an example, the provider may access the workflow through a first platform. The first platform may comprise hardware associated with a mobile device, an operating system running on the mobile device, and/or an application (e.g., a mobile application, a cloud based application, a web browser based application, etc.). In an example, the first platform may be associated with the mobile device of a project team member (e.g., the first platform may be hosted by a smartphone). The provider database and/or the automation component may be located on and/or assessed through a second platform, such as a cloud based platform. Responsive to the valuation task being completed, the workflow may be updated in real time or near real time in response to the completion of the valuation task (e.g., the status of the task may be updated to completed and/or the projected due dates for other valuation tasks may be updated, etc.).

In an example, responsive to completing the task, an automated message component may be utilized to generate an automated message associated with the task being completed. Responsive to generating the automated message, the automated message may be displayed to the project team members and/or project team members associated with the valuation task (e.g., responsive to a provider completing an appraisal, a loan officer may be sent an automated message that the appraisal was completed and an appraisal report will be provided to the loan officer within forty-eight hours). In an example, the automated message may be generated based upon at least one of the status of a task, the workflow, historical information for the provider and/or provider availability information (e.g., responsive to completing the appraisal, the automated message stating that the appraisal report will be provided to the loan officer within forty-eight hours may be generated based upon the next task in the work flow being submitting the appraisal report to the loan officer, the provider having availability within the next forty-eight hours to complete the appraisal report, and/or the historical information for the provider indicating that the provider typically submits appraisal reports within forty-eight hours).

In an example, a set of notification associated with a plurality of valuation tasks may be displayed to the user through the user interface. The notifications within the set of notifications may be ranked based upon a priority and/or relevance to a particular project team member. For example, a first status update notification associated with a provider task may be ranked higher than a second status update notification associated with a lender task based upon the provider accessing the second platform. In yet another example, the second status update notification may be ranked higher than the first status update notification based upon the lender accessing the second platform. In this way, project team members may be efficiently provided with the most relevant notifications.

In an example, the notification may comprise commenting capabilities. The commenting capabilities may comprise a link to a message board, a communication portal, or messaging service (e.g., a message board associated with the workflow, a message board associated with a third party website or portal, such as a bank communication portal, a local message board or instant messenger service native to the associated mobile application, etc.).

By utilizing notifications for valuation tasks and/or the workflow events, an overall user experience may be improved because the notifications may comprise relevant content associated with assigned tasks that otherwise may not have been identified. The task quality and experience will also be improved as the most qualified and/or suited providers will assigned based upon, inter ilia, the provider characteristics and the request elements.

In an example, a secondary task may be assigned to a specialist associated with the secondary task (e.g., a second provider may perform a second task). The secondary task may comprise abstractor task, a notary task, a closing document task (e.g., preparing a trust to transfer a property into at closing, preparing a quick claim deed, etc.), a home inspection task, an insurance inspection task, a surveyor task, title search task, title insurance task, moving task, or the like. The specialist (e.g., second provider) may comprise an abstractor, a notary, a closing attorney, a home inspector, an insurance inspector, a surveyor, a title agent, a moving consultant, or the like. In an example, the workflow may comprise the valuation task and the secondary task. In this way, users and/or project team members may more efficiently and effectively track the status of a task, such as an appraisal or inspection as well as other aspects of a property purchase and/or loan closing. Moreover, the workflow allows providers as well as other specialist to more accurately determine when a task should begin as well as well when a task is due.

In an example, a first task event associated with the valuation task (e.g., a status update may be provided based upon the provider completing the appraisal) and a second task event associated with a second valuation task (e.g., a second status update may be provided in response to the provider submitting an appraisal report) may be recorded in a workflow database. Responsive to the first task event being recorded, a first save point for the workflow database corresponding to the first task event may be created in a history database and responsive to the second task event being recorded, a second save point for the workflow database corresponding to the second task event may be created in the history database. In this way, the status of task within a workflow may be recoverable in the event of a database failure and/or mistaken status updates.

In an example, response to receiving a request to modify a scheduling data structure that includes a plurality of tasks, the request may be determined to be directed towards scheduling a valuation task. A request data structure may be generated comprising request elements corresponding to the request. The request data structure may be analyzed to determine a valuation task having a task parameter. A provider data structure may be assessed from a database via a network communication. The provider data structure may be analyzed to identify a group of providers having provider characteristics corresponding to the task parameter. Provider scores may be determined for providers within the group of providers. The scheduling data structure may be modified and regenerated based upon the provider scores, to assign the valuation task to a provider within the group of providers. In an example, a display screen, such as on a mobile device or computer, may be controlled to display an assignment notification to the provider. In another example, the display screen may be controlled to update a workflow, such as based upon the status of a task being updated.

At 414, the method 400 ends.

Figure 5A:
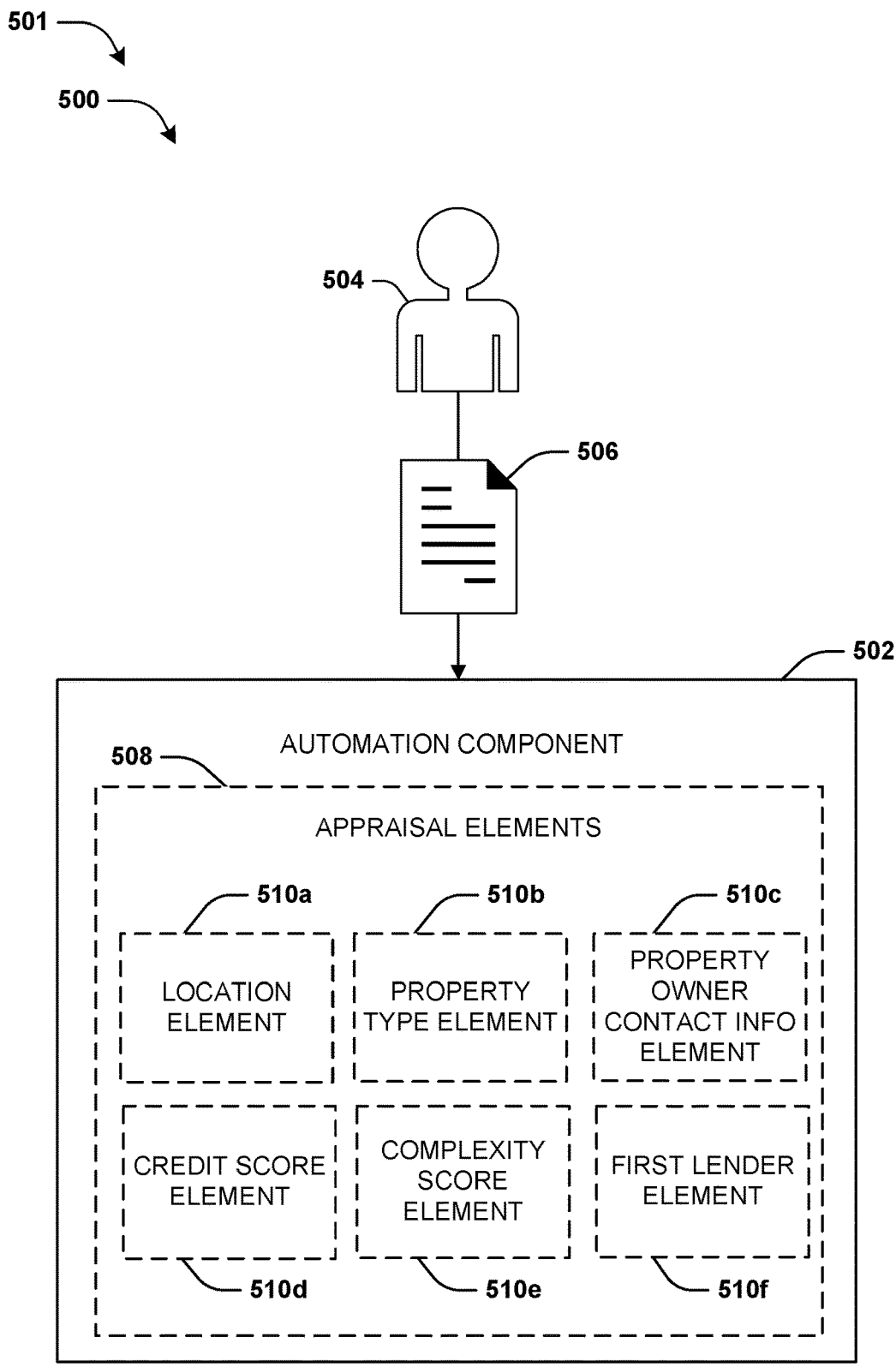
FIG. 5A is a component block diagram illustrating an example system for assigning an appraisal task to an appraiser from a group of appraisers, wherein appraisal elements are identified from a loan document.

FIGS. 5A-5G illustrate examples of a system 500 wherein an automation component 502 is configured to provide an appraisal task 522 to an appraiser through a mobile device 566. In an example, the system 500 may be configured as a software as a service model having physically separated databases that can be located and/or attached to various different networks having various different security protocols (e.g., a first database of appraisers may be located on a cloud server of a licensor and a second database containing loan information may be located on a bank network behind a bank firewall, etc.). In this way, enhanced security measures may be implemented and licensees may be able to utilize existing security protocols without the need to make significant alterations to said protocols to incorporate/grant access to the software as a service model. FIG. 5A illustrates an example 501 of the system 500 where a first lender 504 provides a loan document 506 to the automation component 502. In an example, the loan document 506 may comprise one or more other documents, such as appraisal order documents, questionnaire documents, order request documents, or the like. The automation component 502 may be configured to evaluate the loan document 506 to identify a set of appraisal elements 508. For example, the automation component 502 may utilize machine learning processes to identify the set of appraisal elements 508 from the loan document 506. The set of appraisal elements 508 may comprise location element 510a, property type element 510b, property owner contact info element 510c, credit score element 510d, complexity score element 510e, and/or first lender element 510f. In this way, the appraisal elements 510a-510f may be automatically identified from the loan document 506 and/or similar documents with a no human processing and/or a reduced amount of human processing.

Figure 5B:
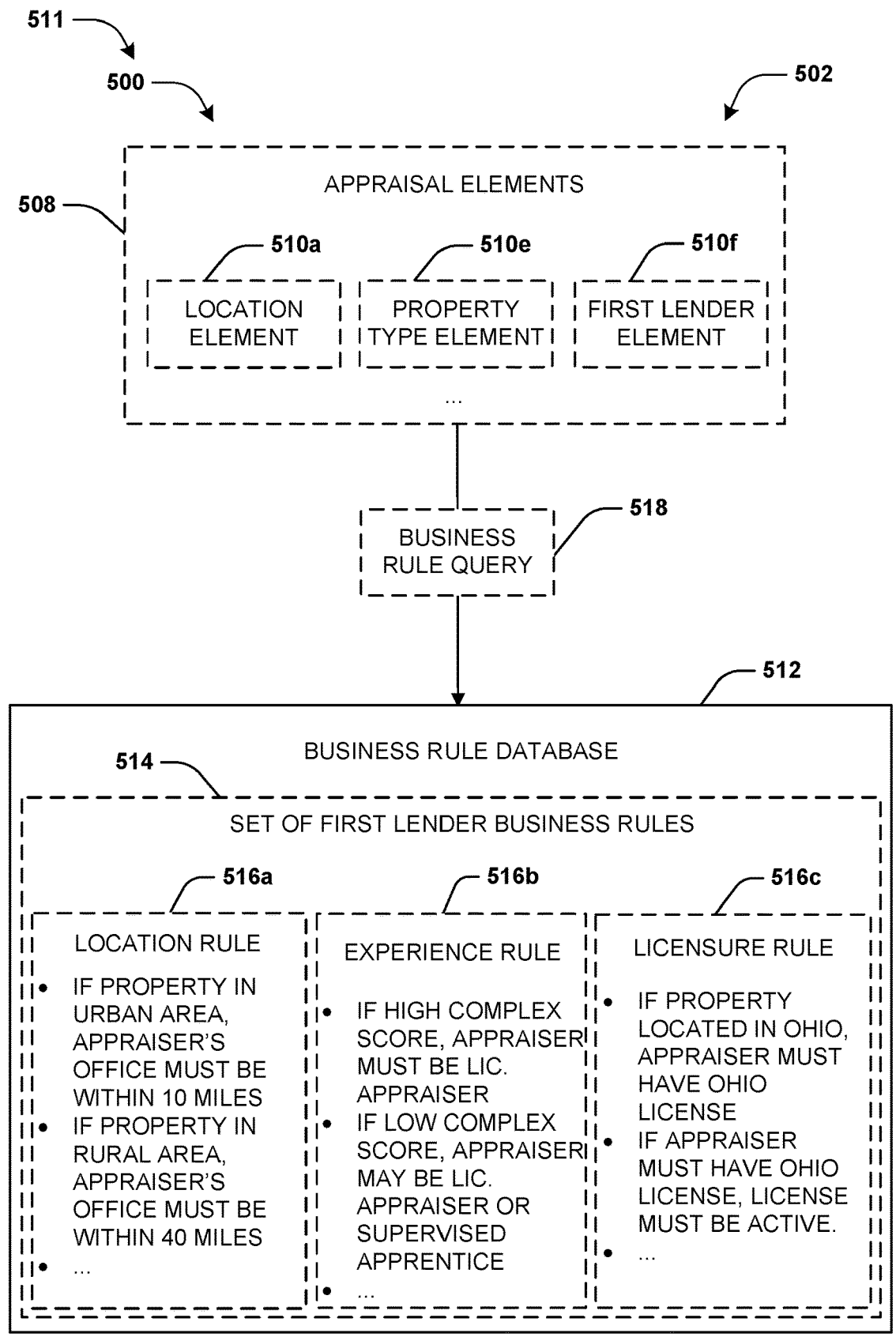
FIG. 5B is a component block diagram illustrating an example system for assigning an appraisal task to an appraiser from a group of appraisers, wherein business rules are identified for a first lender.

FIG. 5B illustrates an example 511 of the system 500 wherein the set of appraisal elements 508 are utilized by the automation component 502 to assess a business rule database 512. In an example, the automation component 502 may generate a business rule query 518 based upon one or more of the appraisal elements within the set of appraisal elements 508, such as the location element 510a, the property type element 510e, and/or the first lender element 510f. The automation component 502 may expand information associated with the appraisal elements to generate the business rule query 518. In an example, the business rule query 518 may comprise alternate spellings of names, addresses, or the like for project team members. In another example, the business rule query 518 may comprise expanded location classifications based upon addresses and map data (e.g., a first address element from the loan document may be expanded to be classified as corresponding to a rural address, a second address may be expanded to be classified as a corresponding to a waterfront location, etc.). The automation component 502 may utilize the business rule query 518 to access the business rule database 512 to identify a set of business rules associated with the appraisal elements 508. In an example, the automation component 502 may identify a set of first lender business rules 514 that correspond to the first lender (not illustrated) based upon first lender element 510f (e.g., one or more business rules pre-set by the lender that submitted the appraisal request may be identified by the automation component). The set of first lender business rules 514 may comprise a location rule 516a, an experience rule 516b, or a licensure rule 516c. The set of first lender business rules 514 may comprise requirements that must be met if a particular element is associated with the loan document (not illustrated). For example, the location rule 516a may require that an appraiser's office must be within 10 miles of a property location if the property is in an urban area and/or the appraiser's office must be within a 40 miles of a property location if the property is in a rural area.

Figure 5C:
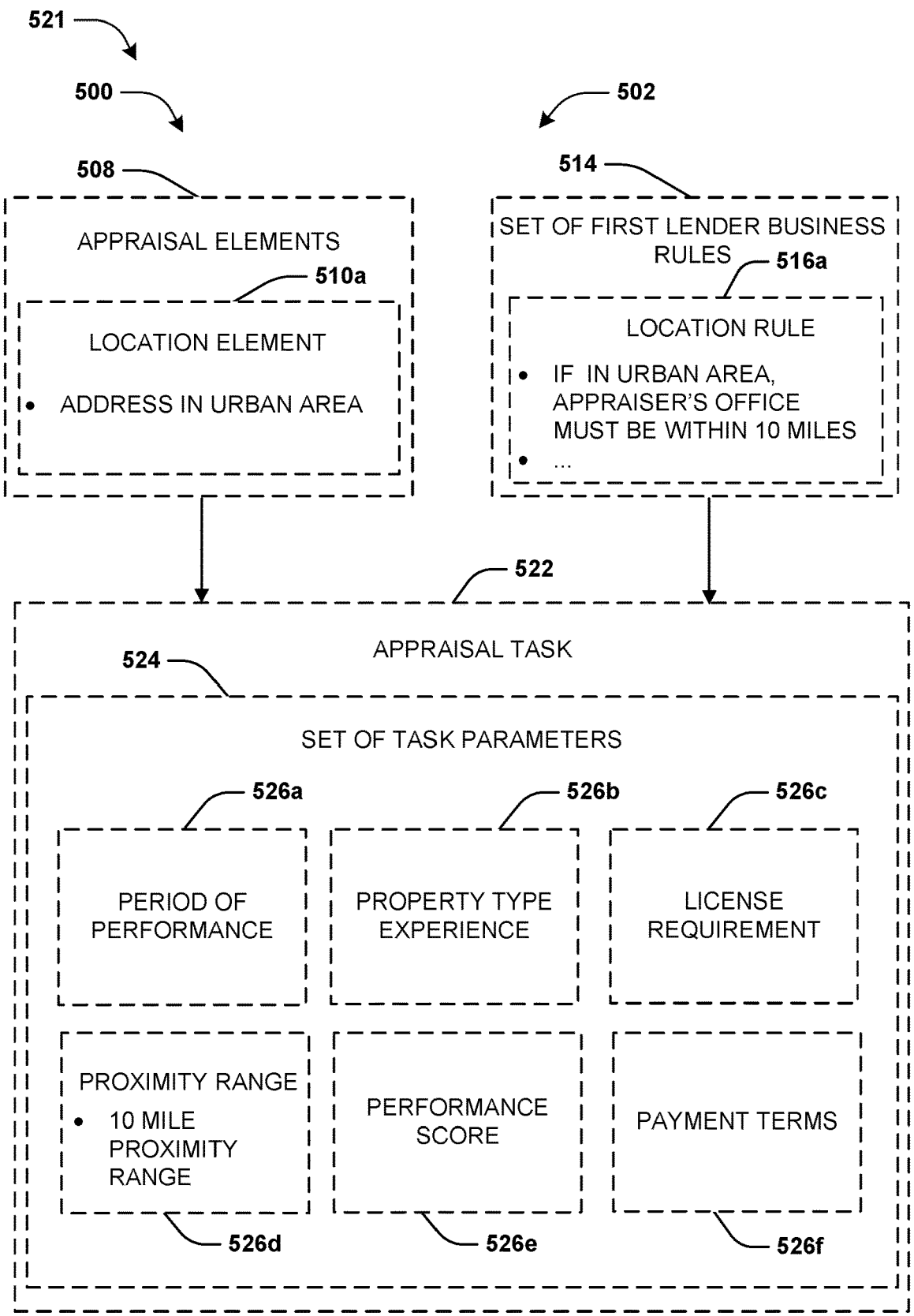
FIG. 5C is a component block diagram illustrating an example system for assigning an appraisal task to an appraiser from a group of appraisers, wherein a set of task parameters for an appraisal task are identified from appraisal elements and business rules.

FIG. 5C illustrates an example 521 of the system 500 wherein the automation component 502 is configured to determine an appraisal task 522 having a set of task parameters 524. For example, the automation component 502 may be configured to evaluate the appraisal elements 508 and the set of first lender business rules 514 to determine the set of task parameters 524. The set of task parameters 524 may comprise a period of performance parameter 526a, a property type experience parameter 526b, a license requirement parameter 526c, a proximity range parameter 526d, an appraiser performance score parameter 526e, or a payment term parameter 526f. In an example, the proximity range parameter 526d may be determined to be 10 miles based upon the location element 510a corresponding to an urban area and the location rule 516a requiring that an appraiser's office must be within 10 miles of the property if the property is in an urban area. The other task parameters within the set of task parameters 524 may be determined in a similar manner (e.g., the period of performance parameter 526a may be determined to be 13 days based upon the property type element 510e corresponding to a single family home and period of performance rule requiring that appraisals on single family homes must be completed within 13 days of acceptance; the license requirement parameter 526c may require an Ohio appraiser license based upon the location element 510a corresponding to Ohio, the complexity score element 510e corresponding to a high score, and the experience rule 516b requiring that a licensed appraiser must complete the appraisal if the complexity score is high; etc.).

Figure 5D:
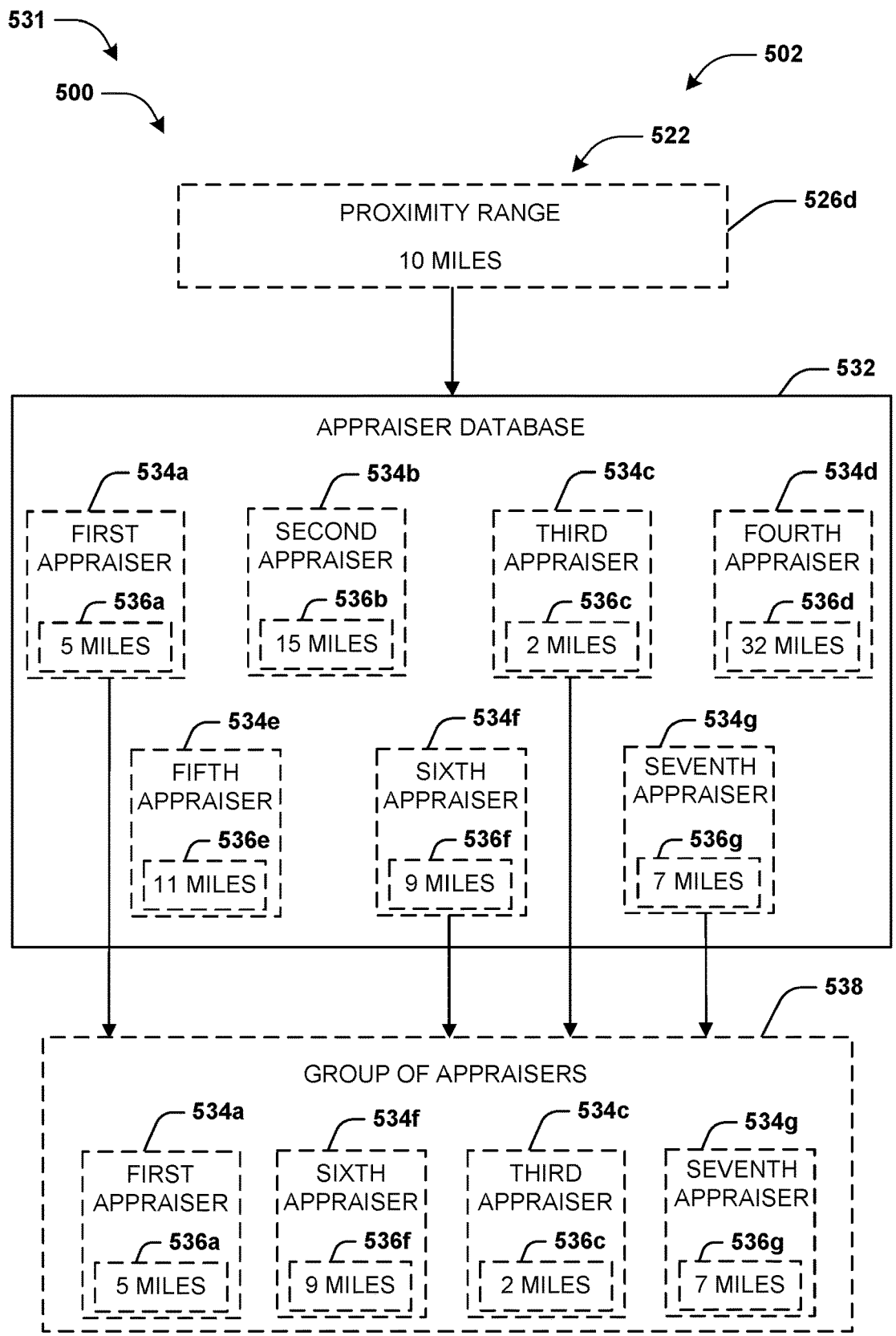
FIG. 5D is a component block diagram illustrating an example system for assigning an appraisal task to an appraiser from a group of appraisers, wherein a group of appraisers is identified from an appraiser database based upon appraiser characteristics.

FIG. 5D illustrates an example 531 of the system 500 wherein the automation component 502 is configured to identify a group of appraisers 538 from an appraiser database 532. In an example, the automation component 502 may utilize task parameters for the appraisal task 522, such as the proximity range parameter 526d to access the appraiser database 532. The appraiser database 532 may comprise a plurality of appraisers, such as a first appraiser 534a, a second appraiser 534b, a third appraiser 534c, a forth appraiser 534d, a fifth appraiser 534e, a sixth appraiser 534f, and a seventh appraiser 534g. The first appraiser 534a may have a first appraiser characteristic 536a corresponding to the first appraisers office being 5 miles away from the appraisal property, the second appraiser 534b may have a second appraiser characteristic 536b corresponding to the second appraisers office being 15 miles away from the appraisal property, the third appraiser 534c may have a third appraiser characteristic 536c corresponding to the third appraisers office being 2 miles away from the appraisal property, the forth appraiser 534d may have a forth appraiser characteristic 536d corresponding to the forth appraisers office being 32 miles away from the appraisal property, the fifth appraiser 534e may have a fifth appraiser characteristic 536e corresponding to the fifth appraisers office being 11 miles away from the appraisal property, the sixth appraiser 534f may have a sixth appraiser characteristic 536f corresponding to the sixth appraisers office being 9 miles away from the appraisal property, and the seventh appraiser 534g may have a seventh appraiser characteristic 536g corresponding to the seventh appraisers office being 7 miles away from the appraisal property. In an example, the appraiser characteristics 534a-534g may be provided by the appraisers by manual entering the appraiser characteristics 534a-534g into the appraiser database 532 and/or the appraisal characteristics 534a-534g may be determined by the automation component 502 based upon information associated with the respective appraiser (e.g., the automation component 502 may determine the proximity distance for the first appraiser 534a by evaluating the first appraisers office location and the property address). Responsive to the proximity range parameter 526d corresponding to 10 miles, the first appraiser 534a, the third appraiser 534c, the sixth appraiser 534f, and the seventh appraiser 534g but not the second appraiser 534b, the forth appraiser 534d, the fifth appraiser 534e, may be determined to be in the group of appraisers based upon the appraiser characteristics 534a-534g. In this way, appraisers meeting the appraisal task parameters may be identified and grouped together.

Figure 5E:
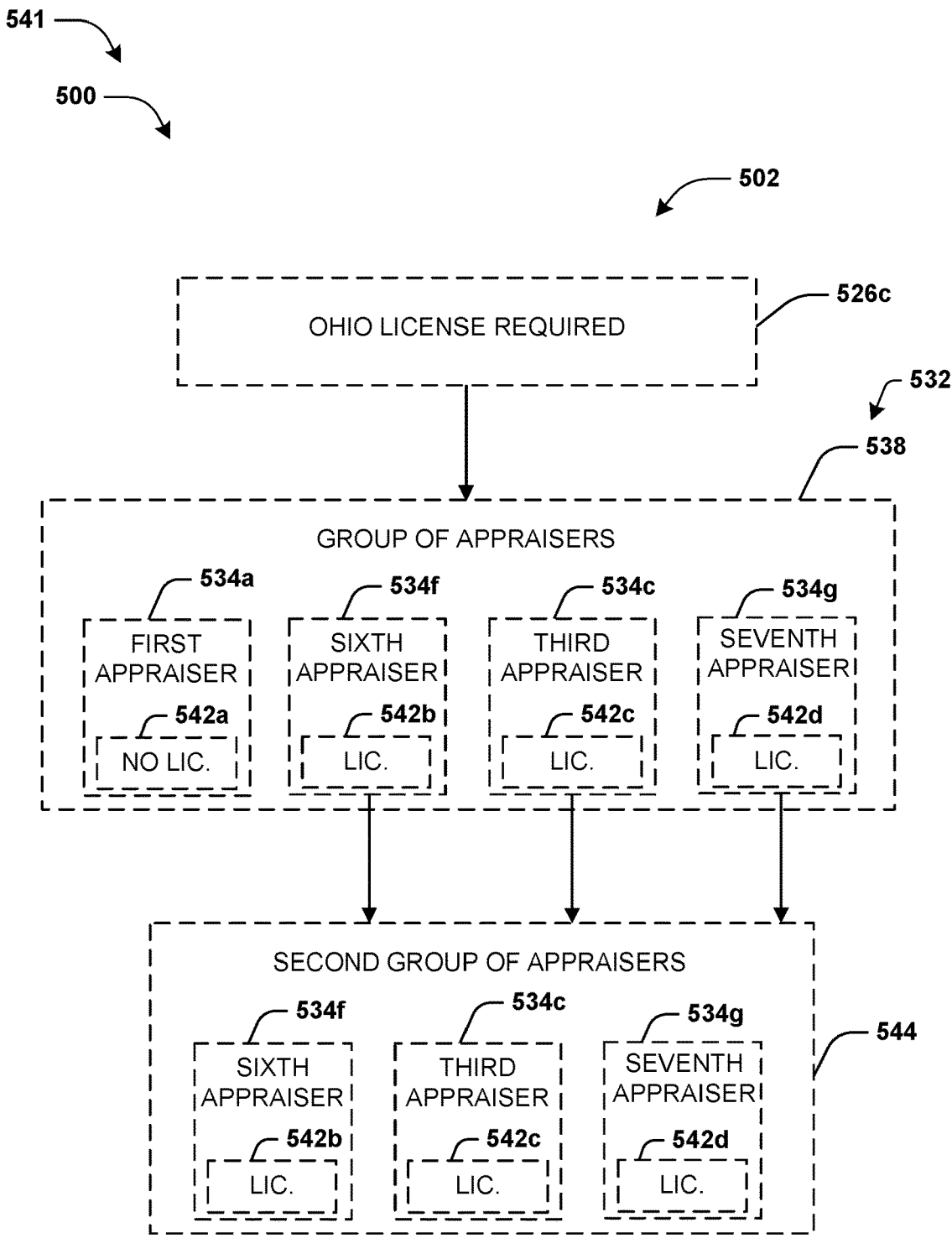
FIG. 5E is a component block diagram illustrating an example system for assigning an appraisal task to an appraiser from a group of appraisers, wherein a second group of appraisers is identified from a group of appraisers.

FIG. 5E illustrates an example 541 of the system 500 wherein the automation component 502 is configured to identify a second group of appraisers 544 from the group of appraisers 538 based upon the license requirement parameter 526c (e.g., a second parameter). In an example, the automation component 502 may utilize the license requirement parameter 526c to access the group of appraisers 538 having license characteristics 542a-542d (e.g., a type of appraiser characteristic) to identify the second group of appraisers 544. In an example, the first appraiser 534a may have a first license characteristic 542a corresponding to not having an Ohio appraiser license, the third appraiser 534c may have a second license characteristic 542b corresponding to having an Ohio appraiser license, the sixth appraiser 534f may have a third license characteristic 542c corresponding to having an Ohio appraiser license, and the seventh appraiser 534g may have a forth license characteristic 536g corresponding to having an Ohio appraiser license.

Figure 5F:
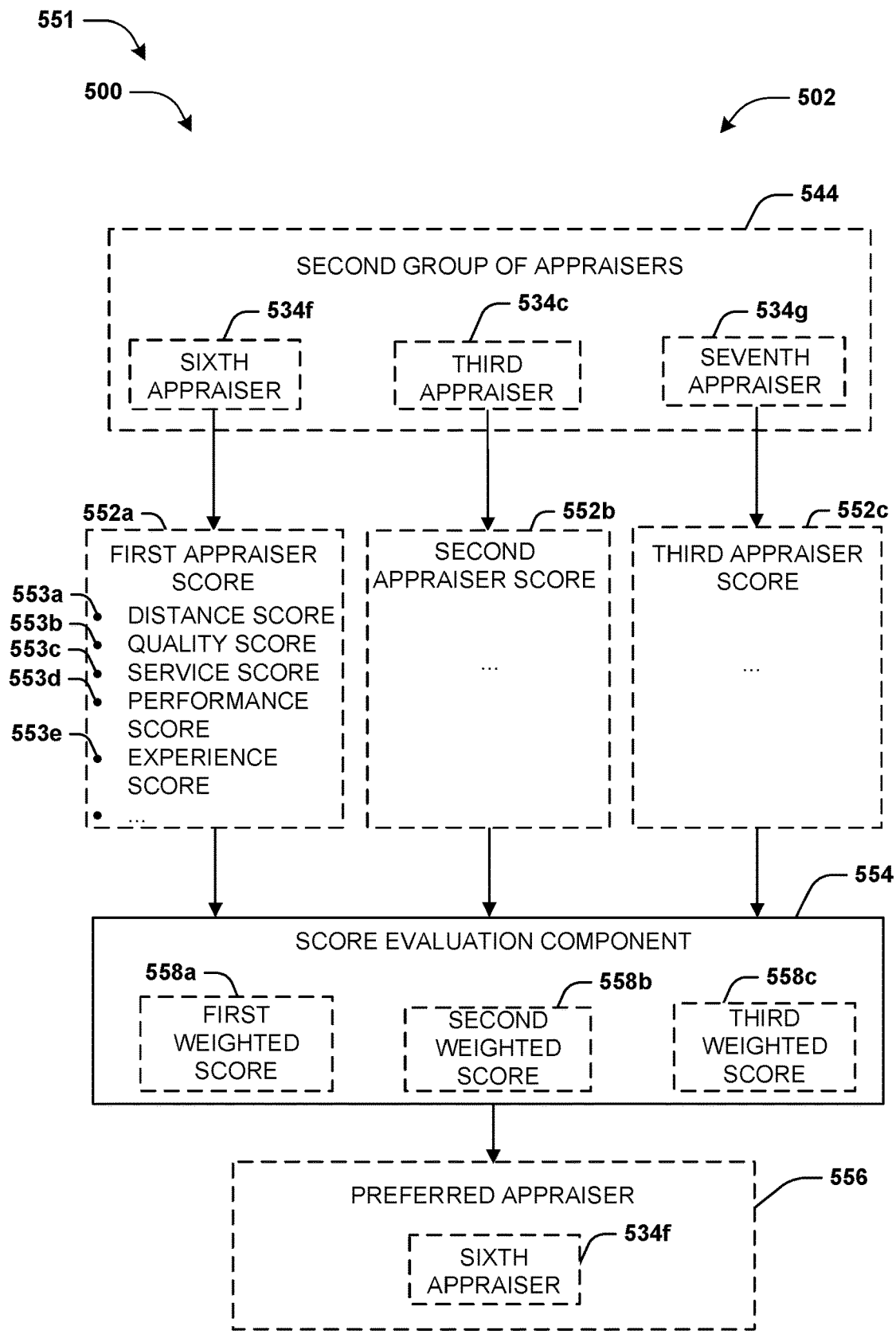
FIG. 5F is a component block diagram illustrating an example system for assigning an appraisal task to an appraiser from a group of appraisers, wherein a preferred appraiser is identified based upon an appraisal score.

FIG. 5F illustrates an example 551 of the system 500 wherein the automation component 502 is configured to identify the sixth appraiser 534f as a preferred appraiser 556 from the second group of appraisers 544. The automation component 502 may be configured to determine appraiser scores 552a-552c for the second group of appraisers 544. In an example, the first appraiser score 552a may be calculated based upon sub-scores, such as a distance score 553a, a quality score 553b, a service score 553c, a performance score 553d, an experience score 553e, compliance score (not illustrated), availability score (no illustrated), or the like. The sub-scores 553a-553e for the sixth appraiser 534f may be determined based upon how well the appraiser characteristics for the sixth appraiser 534f correspond to the task parameters, historical information for the sixth appraiser 534f, and/or real-time appraiser characteristics for the sixth appraiser 534f (e.g., a higher availability score may be assigned to the sixth appraiser 534f in response to the sixth appraiser 534f having 4 appraisal tasks in his work queue and a lower availability score may be assigned to the third appraiser 534c in response to the third appraiser 534c having 8 appraisal tasks in his work queue).

A score evaluation component 554 may be configured to evaluate the appraisal scores 552a-552c to determine a preferred appraiser 556 (e.g., an appraiser that is most suited to perform the appraisal task). The score evaluation component 554 may be configured to weight the sub-scores 552a-552c based upon a weighing factor assigned by a project team member to generate weighted scores 558a-558c, respectively. In an example, the project team member utilize toggle elements displayed on a user interface (not illustrated) to assign weighing factors to sub-scores 552a-552c based upon an importance of particular sub-score to the project team member (e.g., the quality score 553b may be given 10 percent more value by the lender than the experience score 553e). Responsive to the first weighted score 558a for the sixth appraiser 534f being greater than the second weight core 558b of the third appraiser 534c and the third weighted score 558c for the seventh appraiser 534g, the sixth appraiser 534f may be identified from the second group of appraisers 544 as the preferred appraiser 556.

Figure 5G:
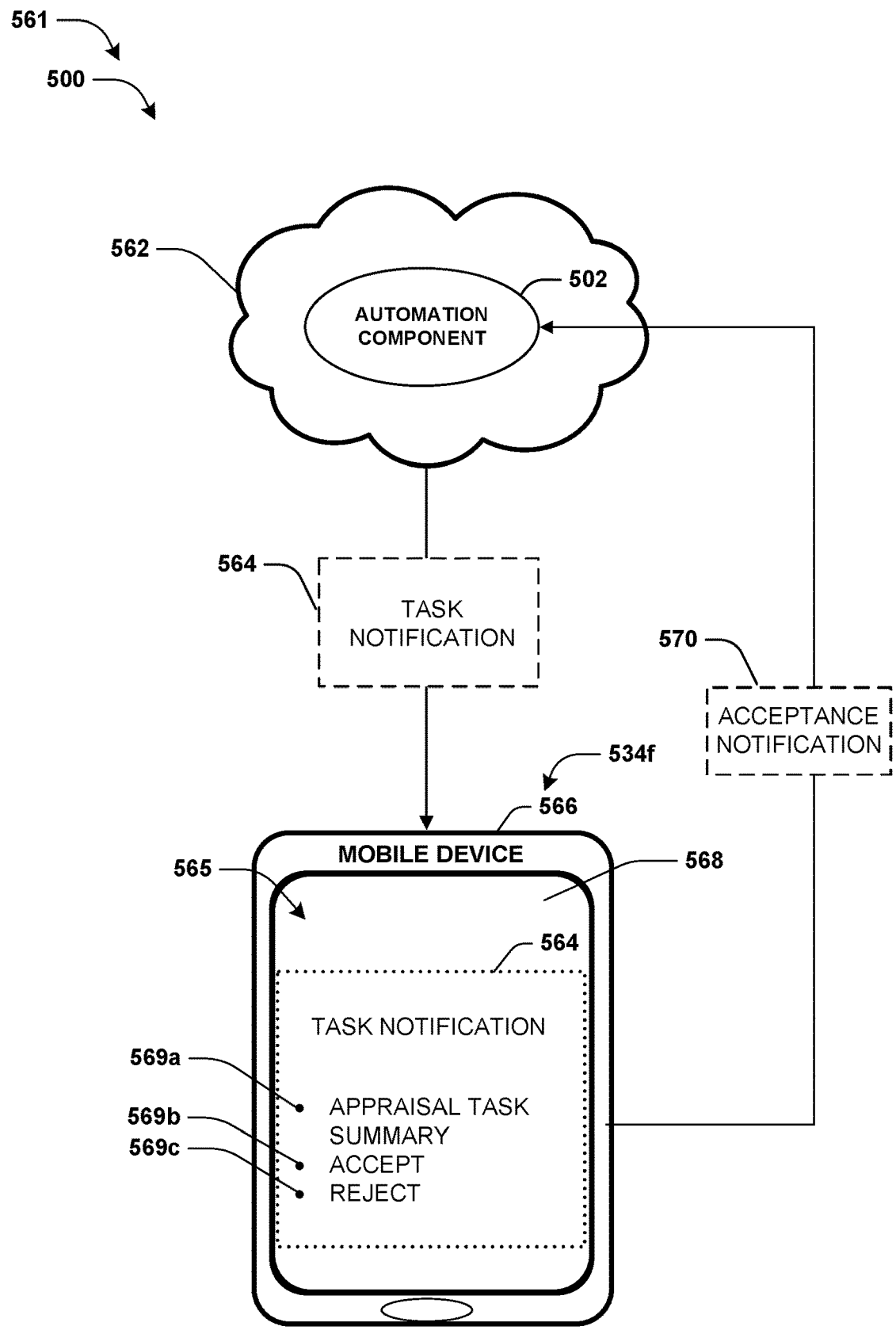
FIG. 5G is a component block diagram illustrating an example system for assigning an appraisal task to an appraiser from a group of appraisers, wherein an assignment notification is provided to an appraiser through a mobile device.

FIG. 5G illustrates an example 561 of the system 500 wherein the automation component 502 is configured to provide a task notification 564 to the sixth appraiser 534f through a mobile device 566. In an example, the automation component 502 may be configured to be hosted on a cloud based platform 562. The automation component 502 may utilize a wireless network to send the task notification 564 to a mobile application 565 running on the mobile device 566. Responsive to the mobile device 566 receiving the task notification 564, the task notification 564 may be configured to be displayed on a display 568 of the mobile device 566. The task notification 564 may comprise an appraisal task summary element 569a (e.g., a summary of the details of the appraisal task 522, such as the location of the property, the time the appraiser has to complete the appraisal task, payment terms, etc.), an acceptance element 569b, or a rejection element 569c. Responsive to the sixth appraiser 534f selecting the acceptance element 569b, an acceptance notification 570 may be provided to the automation component 502. The acceptance element 569b may be indicative of the sixth appraiser 534f accepting the appraisal task 522.

Figure 6:
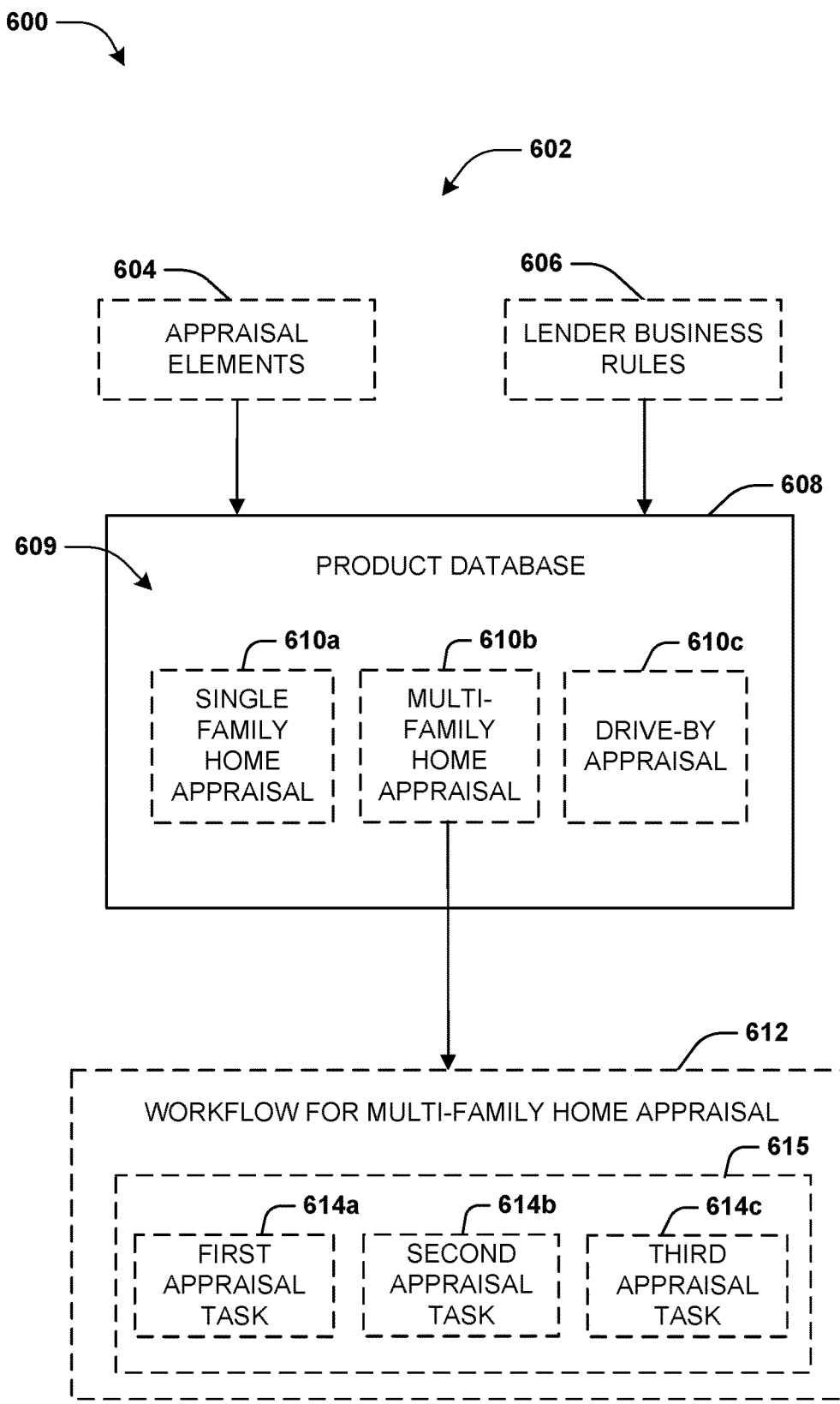
FIG. 6 is a component block diagram illustrating an example system for generating a workflow comprising a set of appraisal tasks.

FIG. 6 illustrates an example of a system 600 wherein an automation component 602 is configured to generate a workflow 612. The automation component 602 may be configured to evaluate appraisal elements 604 and lender business rules 606 to access a product database 608 to identify an appraisal product from a set of products 609. The set of appraisal products 609 may comprise a single family home appraisal product 610a, a multi-family home appraisal product 610b, and a drive-by appraisal product 610c. Responsive to the appraisal elements 604 and/or the lender business rules 606 corresponding to the multi-family home appraisal product 610b, the multi-family home appraisal product 610b may be identified as the product associated with a request from a lender (not illustrated). The automation component 602 may be configured to generate the workflow 612 for the multi-family appraisal product 610b. The workflow 612 may comprise a set of appraisal tasks 615 associated with the multi-family home appraisal product 610b. The set of appraisal tasks 615 may comprise a first appraisal task 614a, a second appraisal task 614b, and a third appraisal task 614c. In an example, the first appraisal task 614a may be assigned to a lender, the second appraisal task 614b may be assigned to an appraiser, and the third appraisal task 614c may be assigned to a barrower (e.g., the first appraisal task 614a may be for the lender to provide a missing property address for an appraisal, the second appraisal task 614b may be for an appraiser to conduct an appraisal, and the third appraisal task 614c may be for the barrower to respond to a question submitted by the appraiser).

Figure 7:
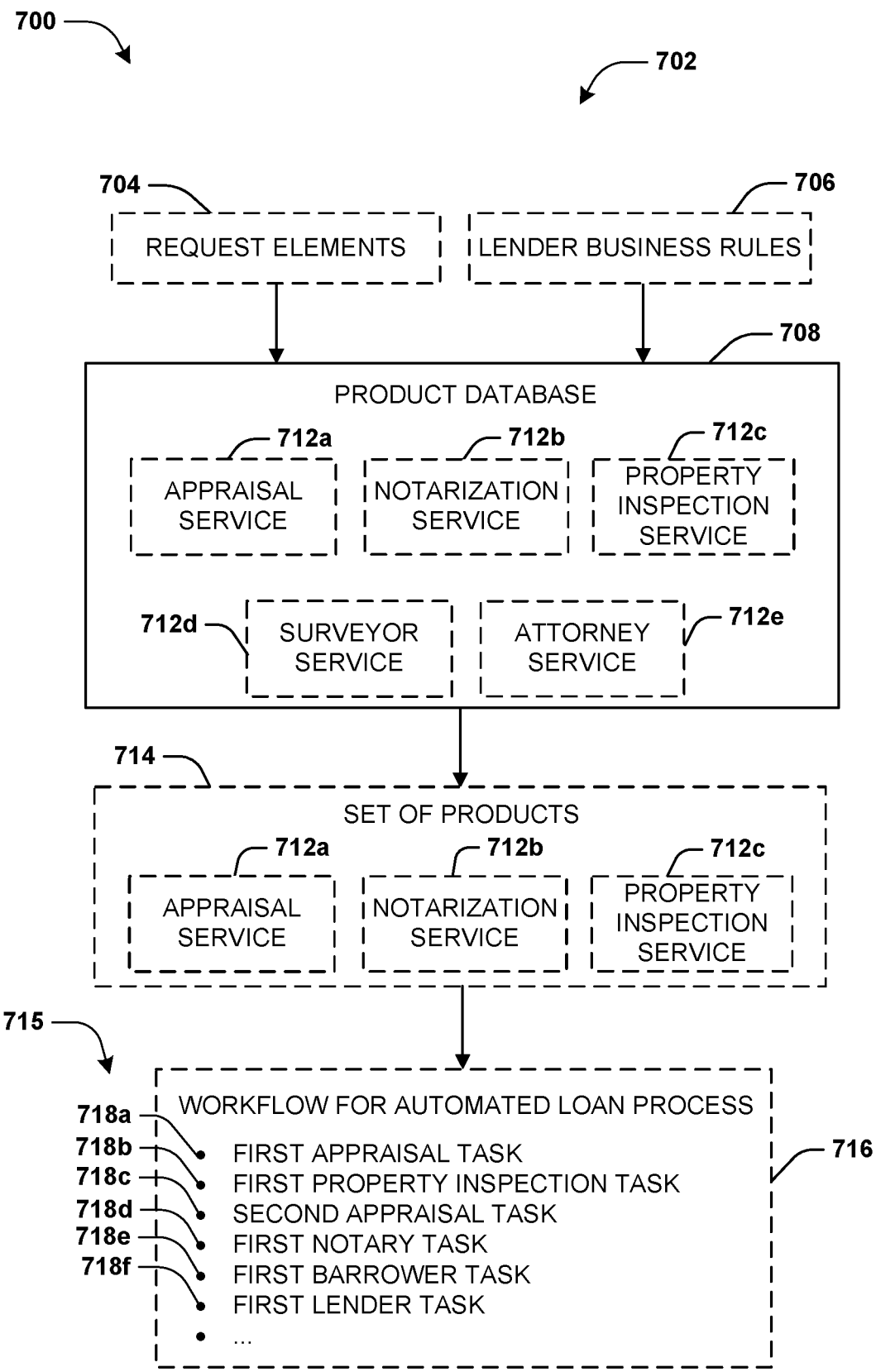
FIG. 7 is a component block diagram illustrating an example system for generating a workflow comprising a plurality of loan related tasks.

FIG. 7 illustrates an example of a system 700 wherein an automation component 702 is configured to generate a workflow 716. The automation component 702 may be configured to evaluate request elements 704 and lender business rules 706 to access a product database 708 to identify a set of products 714 from the product database 708. The product database 708 may comprise an appraisal service product 712a, a notarization service product 712b, a property inspection service product 712c, a surveyor service product 712d, an attorney service product 712e, or the like. In an example, the automation component 702 may determine based upon the request elements 704 and the lender business rules 706 that the appraisal service product 712a, the notarization service product 712b, and the property inspection service product 712c, but not the surveyor service product 712d and the attorney service product 712e, should be included in the set of products 714. The automation component 702 may be configured to generate the workflow 716 based upon the set of products 714, the request elements 704, and/or the lender business rules 706. The workflow 716 may comprise a set of tasks 715 associated with the set of products 714. The set of tasks 715 may comprise may comprise a first appraisal task 718a, a first property inspection task 718b, a second appraisal task 718c, a first notary task 718d, a first barrower task 718e, and/or a first lender task 718f (e.g., the first appraisal task 718a may be to coordinate with an inspector to confirm the home inspection is completed on a property before the appraisal is performed, the first property inspection task 718b may be to perform the home inspection on the property, the second appraisal task 718c may be to perform the appraisal on the property, the first notary task 718d may be to schedule a notary to be present for the singing of a closing document, the first barrower task 718e may be to mail the notarized closing document to the lender, and the first lender task 718f may be to release the funds to the seller of the property). In this way, the tasks, services, and/or products needed to perform a real estate purchase transaction or the like may be efficiently and/or effectively coordinated across a plurality of project team members from a plurality of service providers.

Figure 8A:
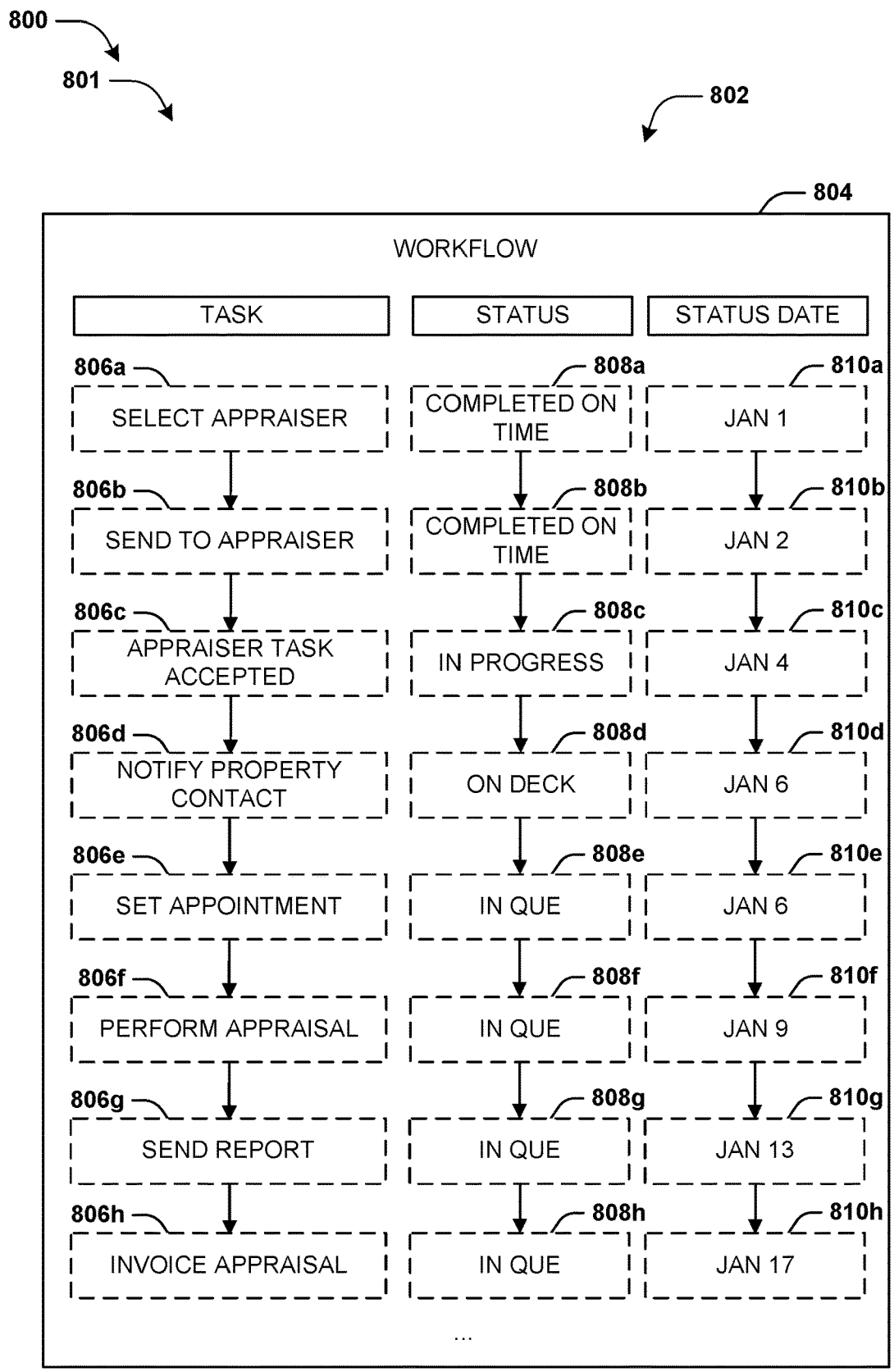
FIG. 8A is a component block diagram illustrating an example system for generating a workflow, wherein the workflow comprises a plurality of tasks having current statuses and due dates.
Figure 8B:
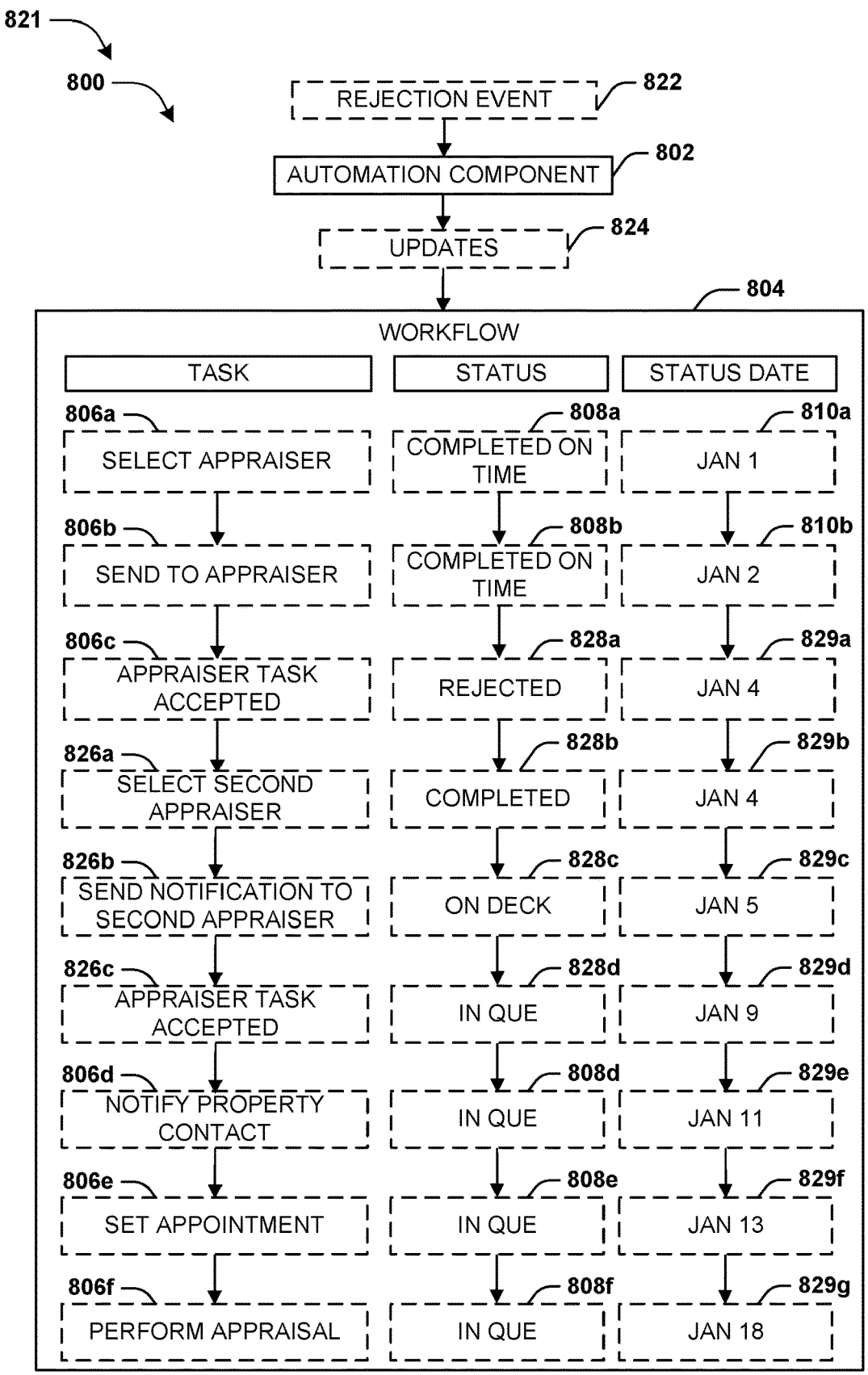
FIG. 8B is a component block diagram illustrating an example system for generating a workflow, wherein the workflow is updated based upon a rejection event.
Figure 8C:
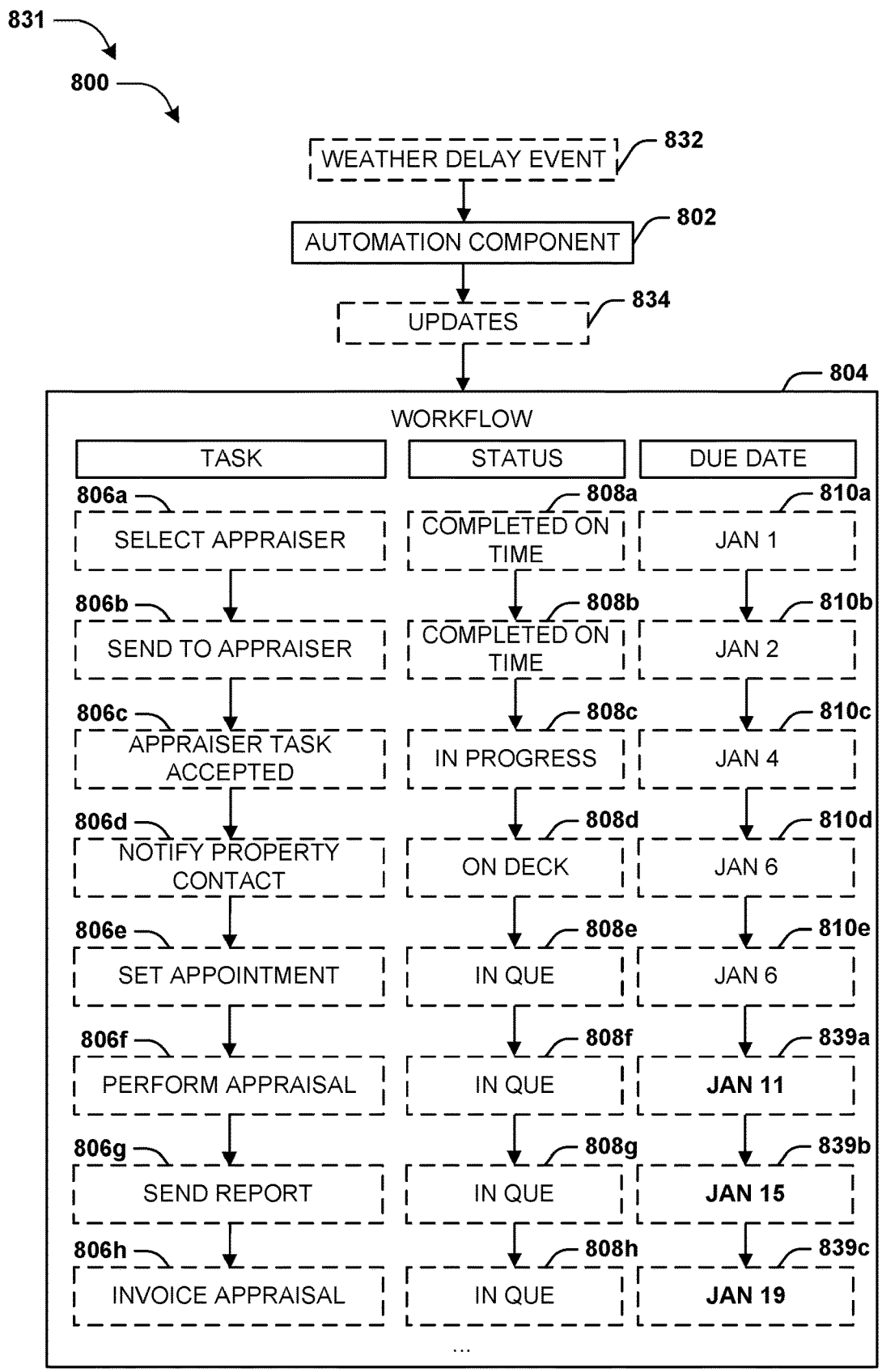
FIG. 8C is a component block diagram illustrating an example system for generating a workflow, wherein the workflow is updated in response to a weather delay event.

FIGS. 8A-8C illustrate examples of a system 800 wherein a workflow 804 is generated by an automation component 802. FIG. 8A illustrates an example 801 of the system 800 wherein a user interface 803 is configured to display the workflow 804 generated by the automation component 802. The workflow 804 may comprise a set of tasks associated with an appraisal product (not illustrated). The set of tasks may comprise a select appraiser task 806a, a send notification to appraiser task 806b, an acceptance task 806c, a notify property contact task 806d, a set appointment task 806e, a perform appraisal task 806f, a send appraisal report task 806g, and/or an invoice lender for appraisal task 806h. The automation component 802 may be configured to display current task statuses 808a-808h for tasks 806a-806h within the workflow 804. The current task statuses 808a-808h may be indicative of the completion state of tasks 806a-806h (e.g., the status may indicate if a task has been completed, if the task is in progress, if the task is next to be completed, if the task is in a work que, etc.). The automation component 802 may be configured to display status dates 810a-810h for the tasks 806a-806h. The status dates 810a-810h may be indicative of a completion date (e.g., status dates 810a-810b may be indicative of an actual completion date) and/or a projected completion date (e.g., status dates 810c-810h may be indicative of a projected completion date) for the tasks 806a-806h. The status dates 810a-810h may be generated by the automation component 802 based upon historical information for the respective task, appraiser, and/or project team member. In an example, the status dates 810a-810h may be updated in real time and/or near real time by the automation component 802. In an example, the status dates 810a-810h may utilize visual elements (not illustrated) to indicate the completion state of the tasks 806a-806h (e.g., task that have been completed may be displayed in green text, tasks that are in progress may be displayed in a yellow text, tasks that are in que may be displayed in a blue text, tasks that are behind schedule may be displayed in a red text, etc.).

FIG. 8B illustrates an example 821 of the system 800 wherein the automation component 802 is configured to update the workflow 804 based upon a rejection event 822. The rejection event 822 may be received by the automation component 802 in response to the appraiser (not illustrated) rejecting an assignment of an appraisal task. Responsive to the automation component 802 receiving the rejection event 822, the workflow 804 may be updated in real time with updates 824. Updates 824 may comprise additional tasks 826a-826c, status updates 828a-828d, and/or updated status dates 829a-829g. For example, responsive to the automation component 802 receiving the rejection event 822, a select second appraiser task 826a, a send second notification to second appraiser task 826b, and/or a second appraiser task accepted task 826c may be added to the workflow 804. Responsive to the rejection event 822 being received by the automation component 802, a rejected status 828a may be provided for the appraiser task accepted task 806c. Responsive to a second appraiser (not illustrated) being selected and/or the rejection event 822 being received, the workflow 804 may be updated with updated status dates 829a-829g. The updated status dates 829a-829g may be generated in response to historical appraisal information associated with the second appraiser.

FIG. 8C illustrates an example 831 of the system 800 wherein the automation component 802 is configured to update the workflow 804 based upon a weather delay event 832. The weather delay event 832 may be received by the automation component 802 in response to a snow storm hitting an area associated with a property to be appraised. Responsive to the automation component 802 receiving the weather delay event 832, the workflow 804 may be updated in real time with updates 834. Updates 834 may comprise updated status dates 839a-839c. Responsive to the weather delay event 832 being indicative of the snow storm lasting 2 days, the workflow 804 may be updated with updated status dates 839a-839c (e.g., the estimated completion dates may be updated to reflect a two day delay based upon the snow storm as well as accounting for appraiser availability, weekends, holidays, etc.). In this way, project team members may be able to efficiently and effectively have access to real time updates regarding the status of tasks, such as tasks associated with a loan approval process for a real estate transaction.

Figure 9:
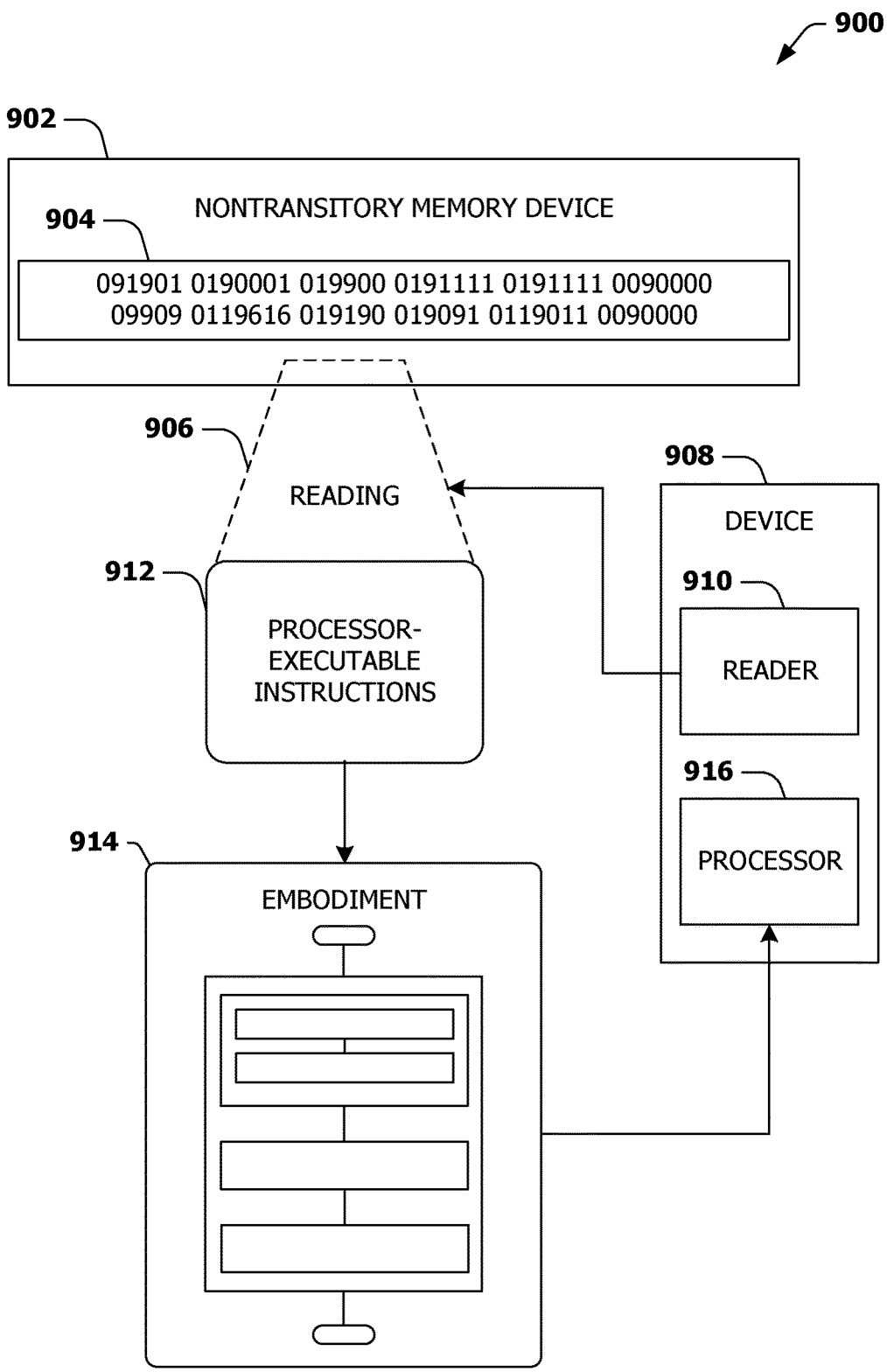
FIG. 9 is an illustration of a scenario featuring an example nontransitory memory device in accordance with one or more of the provisions set forth herein.

FIG. 9 is an illustration of a scenario 900 involving an example nontransitory memory device 902. The nontransitory memory device 902 may comprise instructions that when executed perform at least some of the provisions herein. The nontransitory memory device may comprise a memory semiconductor (e.g., a semiconductor utilizing static random access memory (SRAM), dynamic random access memory (DRAM), and/or synchronous dynamic random dom access memory (SDRAM) technologies), a platter of a hard disk drive, a flash memory device, or a magnetic or optical disc (such as a CD, DVD, or floppy disk). The example nontransitory memory device 902 stores computer-readable data 904 that, when subjected to reading 906 by a reader 910 of a device 908 (e.g., a read head of a hard disk drive, or a read operation invoked on a solid-state storage device), express processor-executable instructions 912. In some embodiments, the processor-executable instructions, when executed on a processor 916 of the device 908, are configured to perform a method, such as at least some of the example method 400 of FIG. 4, for example. In some embodiments, the processor-executable instructions, when executed on the processor 916 of the device 908, are configured to implement a system, such as at least some of the example system 500 of FIGS. 5A-5G, at least some of the example system 600 of FIG. 6, at least some of the example system 700 of FIG. 7, and/or at least some of the example system 800 of FIGS. 8A-8C, for example.

3. Usage of Terms

As used in this application, "component," "module," "system," "interface," and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method of assigning a provider to perform a valuation task, comprising:

in response to receiving a request to modify a scheduling data structure stored in a first database that includes a plurality of tasks, determining that the request is directed towards scheduling a valuation task;

generating a request data structure stored in a second database by a first processor, wherein the request data structure comprises request elements corresponding to the request;

analyzing the request data structure by a second processor to determine a first valuation task having a task parameter;

evaluating at least one of a business rule, a product, a request element of the request elements, or the valuation task to generate a workflow stored in a third database, wherein the workflow comprises the first valuation task and a second valuation task;

accessing a provider data structure from a fourth database via a first network communication;

analyzing the provider data structure by a third processor to identify a group of providers having provider characteristics corresponding to the task parameter;

determining, by a fourth processor, provider scores for providers within the group of providers;

modifying and regenerating the scheduling data structure stored in the first database via a second network communication, based upon the provider scores, to assign the first valuation task to a first provider within the group of providers;

recording a first task event associated with the first valuation task in a workflow database;

recording a second task event associated with the second valuation task in the workflow database;

responsive to the first task event being recorded, creating a first save point for the workflow database in first memory corresponding to the first task event in a history database; and responsive to the second task event being recorded, creating a second save point for the workflow database in the first memory corresponding to the second task event in the history database.

2. The method of claim 1, wherein assigning the first valuation task to the first provider comprises:

controlling a display screen to display an assignment notification to the provider.

3. The method of claim 1, comprising:

responsive to the first provider accepting the first valuation task, updating the workflow with a first status update, wherein the first status update corresponds to the first valuation task being accepted by the first provider; and responsive to the first provider denying the first valuation task, assigning the first valuation task to a second provider within the group of providers.

4. The method of claim 3, comprising:

responsive to the first valuation task being completed by the first provider, updating the workflow with a second status update, wherein the second status update is indicative of the first valuation task being completed;

assigning the second valuation task from the workflow; and updating the workflow with a third status update indicative of the second valuation task being assigned.

5. The method of claim 1, wherein the valuation task comprises at least one of:

accepting an appraisal, contacting a property owner, setting up a meeting, identifying comparable properties, confirming an appraisal meeting time, conducting an appraisal, preparing an appraisal report, submitting the appraisal report, responding to question from a project team member, submitting a revised report, or submitting a satisfaction survey.

6. The method of claim 1, wherein determining the provider scores for the providers within the group of providers comprises:

determining the provider scores based upon one or more sub-scores, wherein the one or more sub-scores comprise at least one of a performance sub-score, a quality sub-score, a compliance sub-score, a distance sub-score, an experience sub-score, an availability sub-score, a remaining volume sub-score, an interest sub-score, or a service sub-score.

7. The method of claim 6, wherein:

the one or more sub-scores comprise at least two sub-scores, and determining the provider scores for the providers within the group of providers comprises:

applying a first weighing factor to a first sub-score of the at least two sub-scores and a second weighting factor to a second sub-score of the at least two sub-scores to generate weighted scores; and utilizing the weighted scores to generate the provider scores for the providers within the group of providers.

8. The method of claim 1, comprising:

responsive to the first provider accepting the first valuation task, accessing a calendar of the first provider to identify a schedule of availability for the first provider, wherein the schedule of availability comprises one or more potential meeting times; and providing the one or more potential meeting times to a project team member as potential meeting times for performing the first valuation task.

9. The method of claim 1, comprising:

accessing an automation component displayed by a user interface, wherein the automation component is configured to be accessed by a project team member;

providing the automation component with loan information;

evaluating the loan information to identify the request; and utilizing the request elements corresponding to the request to access a product database to identify a provider product associated with the request.

10. The method of claim 1, wherein the request elements comprise at least one of:

a location element, a time element, a credit score element, a debt to income ratio element, a property element, an appraisal product element, a complexity score element, a business rule element, a fee type element, a loan type element, a dynamic requirement element, or a business rule exception element.

11. The method of claim 1, comprising:

updating the workflow based upon task events associated with the first valuation task in real-time or near real-time.

12. The method of claim 1, wherein the provider characteristics comprise at least one of:

a provider location, an experience level, an availability status, a provider specialty, or a provider ability to travel.

13. The method of claim 1, comprising:

determining a dynamic vendor due date for the first provider based upon historical information for the first provider; and updating a date of anticipated completion for tasks within the workflow based upon the dynamic vendor due date.

14. The method of claim 1, wherein:

at least two of the first processor, the second processor, the third processor, or the fourth processor are a same processor, and at least two of the first database, the second database, the third database, the fourth database, the workflow database, or the history database are a same database.

15. A system for assigning a provider to perform a valuation task, comprising:

a processor; and memory comprising instructions that when executed by the processor perform operations comprising:

in response to receiving a request to modify a scheduling data structure stored in a first database that includes a plurality of tasks, determine that the request is directed towards scheduling a valuation task;

generate a request data structure stored in a second database, wherein the request data structure comprises request elements corresponding to the request;

analyze the request data structure to determine a first valuation task having a task parameter;

evaluate at least one of a business rule, a product, a request element of the request elements, or the valuation task to generate a workflow stored in a third database, wherein the workflow comprises the first valuation task and a second valuation task;

access a provider data structure from a fourth database via a first network communication;

analyze the provider data structure to identify a group of providers having provider characteristics corresponding to the task parameter;

determine provider scores for providers within the group of providers;

modify and regenerate the scheduling data structure stored in the first database via a second network communication, based upon the provider scores, to assign the first valuation task to a first provider within the group of providers;

record a first task event associated with the first valuation task in a workflow database;

record a second task event associated with the second valuation task in the workflow database;

responsive to the first task event being recorded, create a first save point for the workflow database in first storage corresponding to the first task event in a history database; and responsive to the second task event being recorded, create a second save point for the workflow database in the first storage corresponding to the second task event in the history database.

16. The system of claim 15, wherein the operations comprise:
controlling a display screen to display an assignment notification to the provider.

17. The system of claim 15, wherein the operations comprise:
responsive to the first provider accepting the first valuation task, update the workflow with a first status update, wherein the first status update corresponds to the first valuation task being accepted by the first provider; and
responsive to the first provider denying the first valuation task, assigning the first valuation task to a second provider within the group of providers.

18. The system of claim 15, wherein the operations comprise:
determine the provider scores for the providers within the group of providers based upon at least two sub-scores by:
applying a first weighing factor to a first sub-score of the at least two sub-scores and a second weighing factor to a second sub-score of the at least two sub-scores to generate weighted scores; and
utilizing the weighted scores to generate the provider scores for the providers within the group of providers.

19. The system of claim 15, wherein the operations comprise:
responsive to the first provider accepting the first valuation task, accessing a calendar of the first provider to identify a schedule of availability for the first provider, wherein the schedule of availability comprises one or more potential meeting times; and
providing the one or more potential meeting times to a project team member as potential meeting times for performing the first valuation task.

20. A non-transitory computer readable medium comprising computer executable instructions that when executed by a processor perform a method of assigning a provider to perform a valuation task, the method comprising:
in response to receiving a request to modify a scheduling data structure stored in a first database that includes a plurality of tasks, determining that the request is directed towards scheduling a valuation task;

generating a request data structure stored in a second database by a first processor, wherein the request data structure comprises request elements corresponding to the request;

analyzing the request data structure by a second processor to determine a first valuation task having a task parameter;

evaluating at least one of a business rule, a product, a request element of the request elements, or the valuation task to generate a workflow stored in a third database, wherein the workflow comprises the first valuation task and a second valuation task;

accessing a provider data structure from a fourth database via a first network communication;

analyzing the provider data structure by a third processor to identify a group of providers having provider characteristics corresponding to the task parameter;

determining, by a fourth processor, provider scores for providers within the group of providers;

modifying and regenerating the scheduling data structure stored in the first database via a second network communication, based upon the provider scores, to assign the first valuation task to a first provider within the group of providers;

recording a first task event associated with the first valuation task in a workflow database;

recording a second task event associated with the second valuation task in the workflow database;

responsive to the first task event being recorded, creating a first save point for the workflow database in first memory corresponding to the first task event in a history database; and responsive to the second task event being recorded, creating a second save point for the workflow database in the first memory corresponding to the second task event in the history database.

* * * * *